US012579400B2

(12) United States Patent
Katano et al.

(10) Patent No.: US 12,579,400 B2
(45) Date of Patent: Mar. 17, 2026

(54) INLET AND CARD MEDIUM

(71) Applicant: TOPPAN HOLDINGS INC., Tokyo (JP)

(72) Inventors: Yukiko Katano, Tokyo (JP); Shin Kataoka, Tokyo (JP); Shigeki Minemura, Tokyo (JP)

(73) Assignee: TOPPAN HOLDINGS INC., Tokyo (JP)

( * ) Notice: Subject to any disclaimer, the term of this patent is extended or adjusted under 35 U.S.C. 154(b) by 0 days.

(21) Appl. No.: 18/676,474

(22) Filed: May 28, 2024

(65) Prior Publication Data

US 2024/0320461 A1 Sep. 26, 2024

Related U.S. Application Data

(63) Continuation of application No. PCT/JP2022/043851, filed on Nov. 29, 2022.

(30) Foreign Application Priority Data

Nov. 29, 2021 (JP) ................................. 2021-193350

(51) Int. Cl.
*G06K 19/077* (2006.01)
*G06K 19/07* (2006.01)
(52) U.S. Cl.
CPC ... *G06K 19/07722* (2013.01); *G06K 19/0718* (2013.01); *G06K 19/0723* (2013.01); *G06K 19/07777* (2013.01)
(58) Field of Classification Search
CPC ......... G06K 19/07722; G06K 19/0718; G06K 19/0723

(Continued)

(56) References Cited

U.S. PATENT DOCUMENTS

2006/0072355 A1* 4/2006 Ebihara .............. G06V 40/1306
365/149
2006/0097059 A1* 5/2006 Miyazaki ......... G06K 19/07745
235/492

(Continued)

FOREIGN PATENT DOCUMENTS

JP 2006-134145 A 5/2006
JP 2019-511058 A 4/2019

(Continued)

OTHER PUBLICATIONS

International Searching Authority, "International Search Report," issued in connection with International Patent Application No. PCT/JP2022/043851, dated Jan. 31, 2023.

(Continued)

*Primary Examiner* — Allyson N Trail
(74) *Attorney, Agent, or Firm* — Foley & Lardner LLP

(57) ABSTRACT

An inlet embedded in a card medium, the inlet including: an exposed component at least partially exposed on a front surface of the card medium; a circuit board including a board wiring part to which the exposed component is bonded on a front surface side, the circuit board being provided closer to a back surface of the card medium than the exposed component is; and a sheet circuit board provided closer to the front surface than the circuit board is, the sheet circuit board including a sheet wiring part electrically connected to the board wiring part on a back surface side, and a sheet including at least one sheet through hole through which the exposed component can pass.

8 Claims, 15 Drawing Sheets

(58) Field of Classification Search
USPC .......................................................... 235/492
See application file for complete search history.

(56)                 References Cited

U.S. PATENT DOCUMENTS

| | | | |
|---|---|---|---|
| 2006/0214294 A1* | 9/2006 | Fukasawa | H01L 24/94 |
| | | | 257/E21.597 |
| 2017/0154742 A1* | 6/2017 | Hisano | H04M 1/236 |
| 2017/0213097 A1* | 7/2017 | Vogel | G06V 10/147 |
| 2019/0102665 A1 | 4/2019 | Snell et al. | |
| 2019/0244210 A1* | 8/2019 | Cheng | G06K 19/07705 |
| 2020/0051061 A1* | 2/2020 | Gandolfo | G07F 7/084 |
| 2020/0285929 A1* | 9/2020 | Rahman | G06K 19/0718 |
| 2021/0049439 A1* | 2/2021 | Finn | G06K 19/07354 |
| 2021/0064949 A1* | 3/2021 | Tsai | G06K 19/0712 |
| 2021/0295127 A1* | 9/2021 | Boudreau | G06Q 20/341 |
| 2021/0383185 A1* | 12/2021 | Mathieu | H10F 39/018 |
| 2022/0076267 A1* | 3/2022 | Kim | G06Q 20/341 |
| 2022/0269918 A1* | 8/2022 | Su | G06V 40/1306 |
| 2022/0300965 A1* | 9/2022 | Chou | G06Q 20/3821 |
| 2023/0017273 A1* | 1/2023 | Beelen-Hendrikx | |
| | | | G06K 19/07354 |
| 2023/0111259 A1* | 4/2023 | Katano | G06K 19/0718 |
| | | | 235/492 |
| 2023/0306214 A1* | 9/2023 | Katano | G06K 19/0718 |
| 2023/0359857 A1* | 11/2023 | Uehara | H05K 1/186 |
| 2024/0070425 A1* | 2/2024 | Lowe | G06Q 20/40145 |
| 2024/0127621 A1* | 4/2024 | Slottner | G06K 19/0718 |
| 2024/0412025 A1* | 12/2024 | Aubert | G06K 19/07354 |
| 2024/0419770 A1* | 12/2024 | Benkley, III | H04L 9/0866 |

FOREIGN PATENT DOCUMENTS

| | | |
|---|---|---|
| WO | WO-2020/204831 A1 | 10/2020 |
| WO | WO-2021/081175 A1 | 4/2021 |

OTHER PUBLICATIONS

International Searching Authority, "Written Opinion," issued in connection with International Patent Application No. PCT/JP2022/043851, dated Jan. 31, 2023.

* cited by examiner

INLET AND CARD MEDIUM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2022/043851, filed on Nov. 29, 2022, which is based upon and claims the benefit to Japanese Patent Application No. 2021-193350 filed on Nov. 29, 2021, the disclosures of which are incorporated herein by reference in their entirety.

TECHNICAL FIELD

The present invention relates to an inlet and a card medium.

BACKGROUND

Various kinds of card media are used including credit cards, cash cards, prepaid cards, membership cards, gift cards, transportation cards, passports, and driver's licenses. Further, in recent years, card media provided with IC (Integrated Circuit) modules (hereinafter simply referred to as "IC cards") have become popular because they improve the efficiency of information processing and offer security of personal information and the like. An IC module integrates processors such as a CPU and a coprocessor (for example, a cryptographic processing circuit), and memories such as ROM, RAM, and EEPROM. Such IC cards having communication functions are classified into contact type and contactless type depending on the kind of external communication terminal. IC cards having biometric authentication functions such as fingerprint sensors are known.

A circuit board and elements such as an IC module and an antenna mounted on the circuit board are embedded in the card body of an IC card. For example, PTL 1 discloses a smart card (IC card) including a secure element and a fingerprint processing unit that are connected to a flexible circuit board, and a contact pad electrically connected to the secure element. In the smart card described in PTL 1, the contact pad is arranged so that it is exposed on the front surface of the body of the smart card. The contact pad is accommodated in an opening formed in the front surface of the card body.

[Citation List] [Patent Literature] [PTL 1] JP 2019-511058 A.

SUMMARY OF THE INVENTION

Technical Problem

In the smart card described in PTL 1, a spacer (extension block) is provided to adjust the height of an exposed component (contact pad) exposed on the front surface of the card, but there is a gap between the exposed component and the spacer. Since the relative position of the exposed component shifts due to the increased number of bonding points between the exposed component and the spacer, the accuracy of the positioning of the exposed component decreases. In addition, the provision of the spacer increases the number of contacts, which in turn creates a risk of connection failure.

The present invention has been made in consideration of these circumstances. An object of the present invention is to provide an inlet that allows an exposed component bonded to a circuit board to be accurately positioned with respect to a sheet circuit board, and a card medium that allows an exposed component to be accurately positioned with respect to an opening in an exterior base material covering a circuit board.

Solution to Problem

In order to solve the above problem, the present invention proposes the following solution.

An inlet according to a first aspect of the present invention is an inlet embedded in a card medium, the inlet including: an exposed component at least partially exposed on a front surface of the card medium; a circuit board including a board wiring part to which the exposed component is bonded on a front surface side, the circuit board being provided closer to a back surface of the card medium than the exposed component is; and a sheet circuit board provided closer to the front surface than the circuit board is, the sheet circuit board including a sheet wiring part electrically connected to the board wiring part on a back surface side, and a sheet including at least one sheet through hole through which the exposed component can pass.

According to a second aspect of the present invention, in the inlet according to the first aspect, the exposed component may include a biometric sensor that detects biometric information of a user.

According to a third aspect of the present invention, in the inlet according to the first or second aspect, the exposed component may include a contact terminal that makes contact with a contact-type external device, and the circuit board may further include an internal component having a contact-type communication function on the back surface side.

According to a fourth aspect of the present invention, in the inlet according to the first or second aspect, the circuit board may include an internal component having a contactless-type communication function on the back surface side, and the sheet circuit board may further include a loop antenna on the back surface side.

According to a fifth aspect of the present invention, in the inlet according to the third or fourth aspect, the exposed component, the board wiring part, and the internal component may all be included in the same circuit board.

According to a sixth aspect of the present invention, in the inlet according to the fourth aspect, the circuit board may have a connection part of the loop antenna having a jumper wiring function, and the sheet wiring part may be entirely placed on the back surface side of the sheet.

According to a seventh aspect of the present invention, in the inlet according to any one of the third to sixth aspects, the internal component may be provided on a back surface side of the exposed component, and an internal component through hole through which the internal component can pass may be formed in the circuit board.

A card medium according to an eighth aspect of the present invention includes:

an inlet;

an upper external base material; and a lower external base material.

The inlet includes an exposed component at least partially exposed on a front surface of the card medium, a circuit board including a board wiring part to which the exposed component is bonded on a front surface side, the circuit board being provided closer to a back surface of the card medium than the exposed component is, and a sheet circuit board provided closer to the front surface than the circuit board is, the sheet circuit board including a sheet wiring part electrically connected to the board wiring part, and a sheet including at least one sheet through hole through which the exposed component can pass, the upper exterior base material is provided closer to the front surface than the inlet is, and includes at least one penetrable external through hole at substantially the same position as the sheet through hole, and the lower exterior base material is provided closer to the back surface than the inlet is.

According to a ninth aspect of the present invention, in the card medium according to the eighth aspect, a size of the exterior through hole may be larger than a size of the sheet through hole.

Advantageous Effects of the Invention

According to the inlet of the present invention, an exposed component bonded to a circuit board can be more accurately placed with respect to the sheet circuit board. According to the card medium of the present invention, an exposed component bonded to a circuit board can be more accurately placed with respect to an opening in an external base material covering the circuit board.

DETAILED DESCRIPTION

First Embodiment

With reference to FIGS. 1 to 5, a first embodiment of the present invention will be described.

Figure 1:
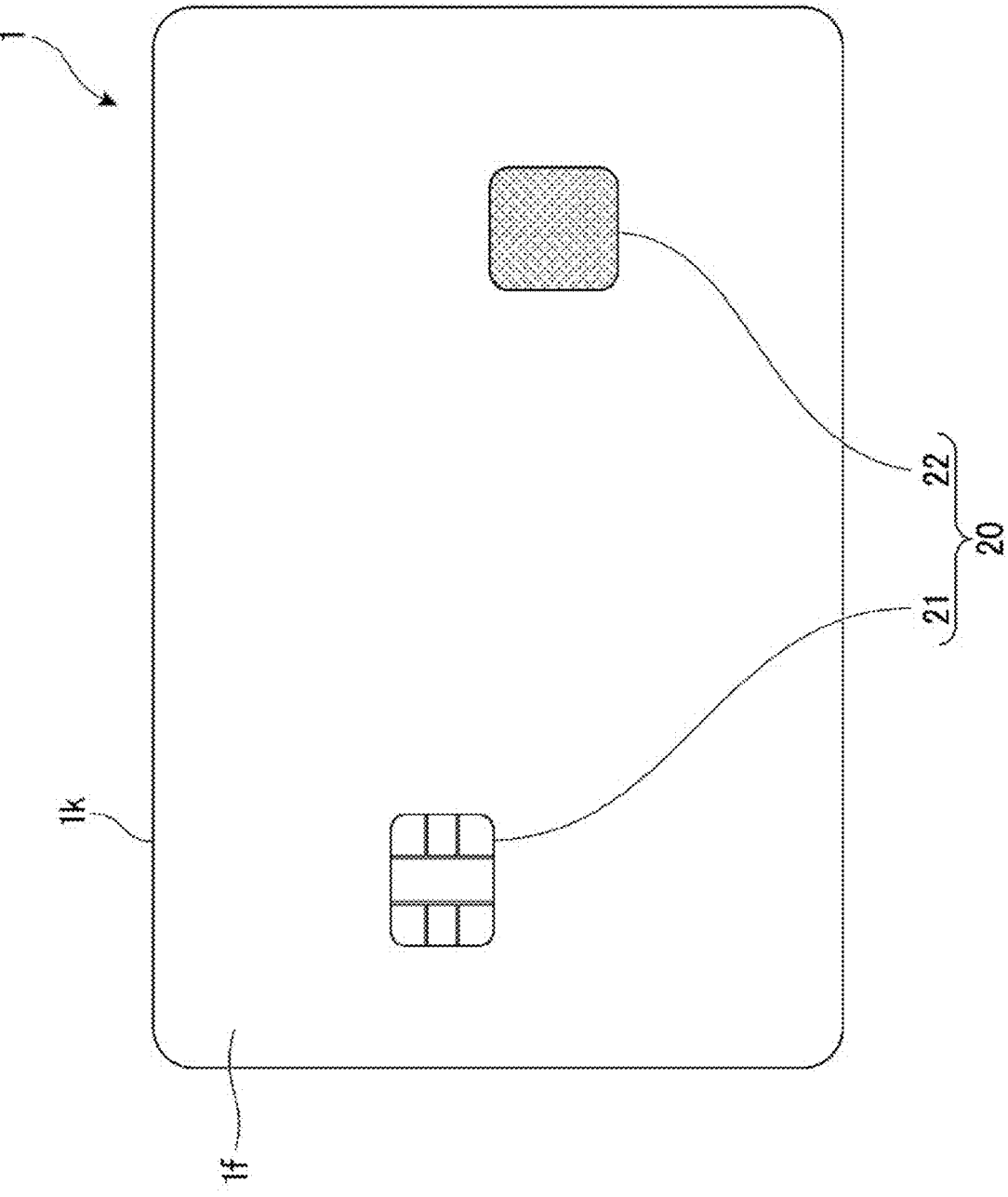
FIG. 1 is an external view of an IC card as viewed from a front surface side according to the first embodiment of the present invention.
Figure 2A:
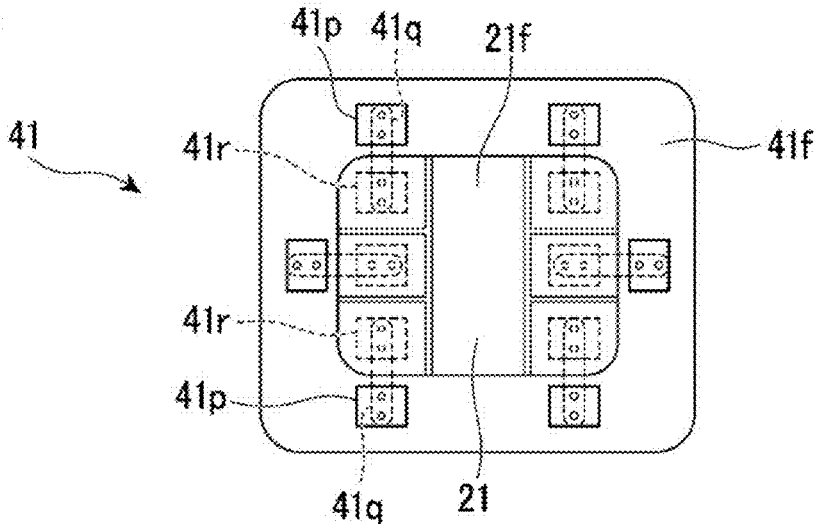
FIG. 2A is a diagram of a circuit board having a contact terminal of the IC card according to the first embodiment as viewed from the front surface side.
Figure 2B:
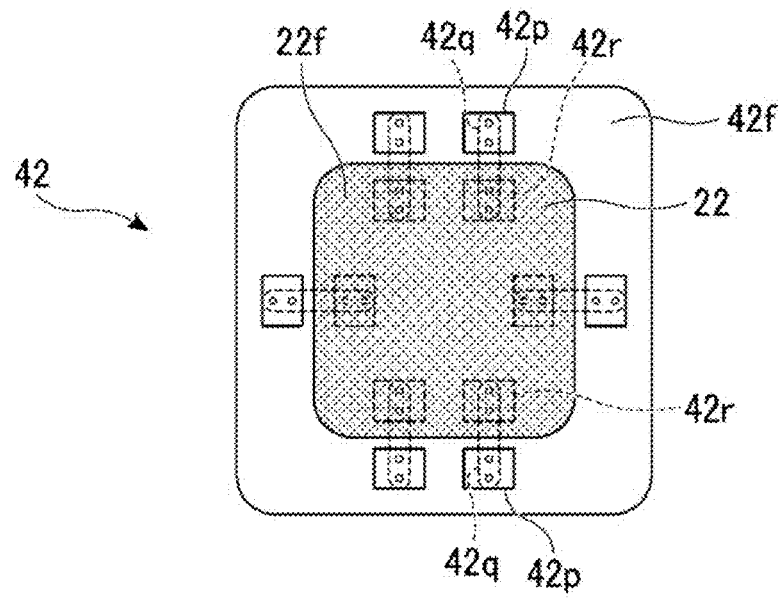
FIG. 2B is a diagram of a circuit board having a fingerprint sensor (biometric authentication sensor) of the IC card according to the first embodiment as viewed from the front surface side.
Figure 2C:
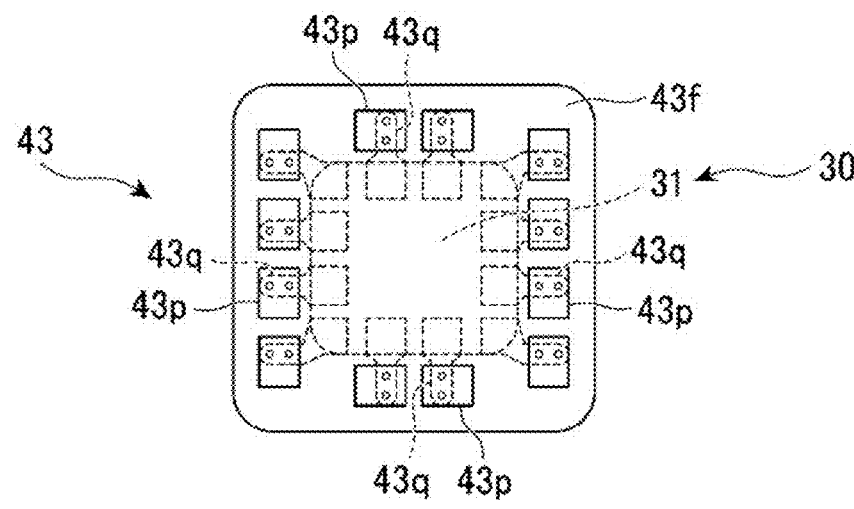
FIG. 2C is a diagram of a circuit board having a secure microcomputer IC of the IC card according to the first embodiment as viewed from the front surface side.
Figure 3:
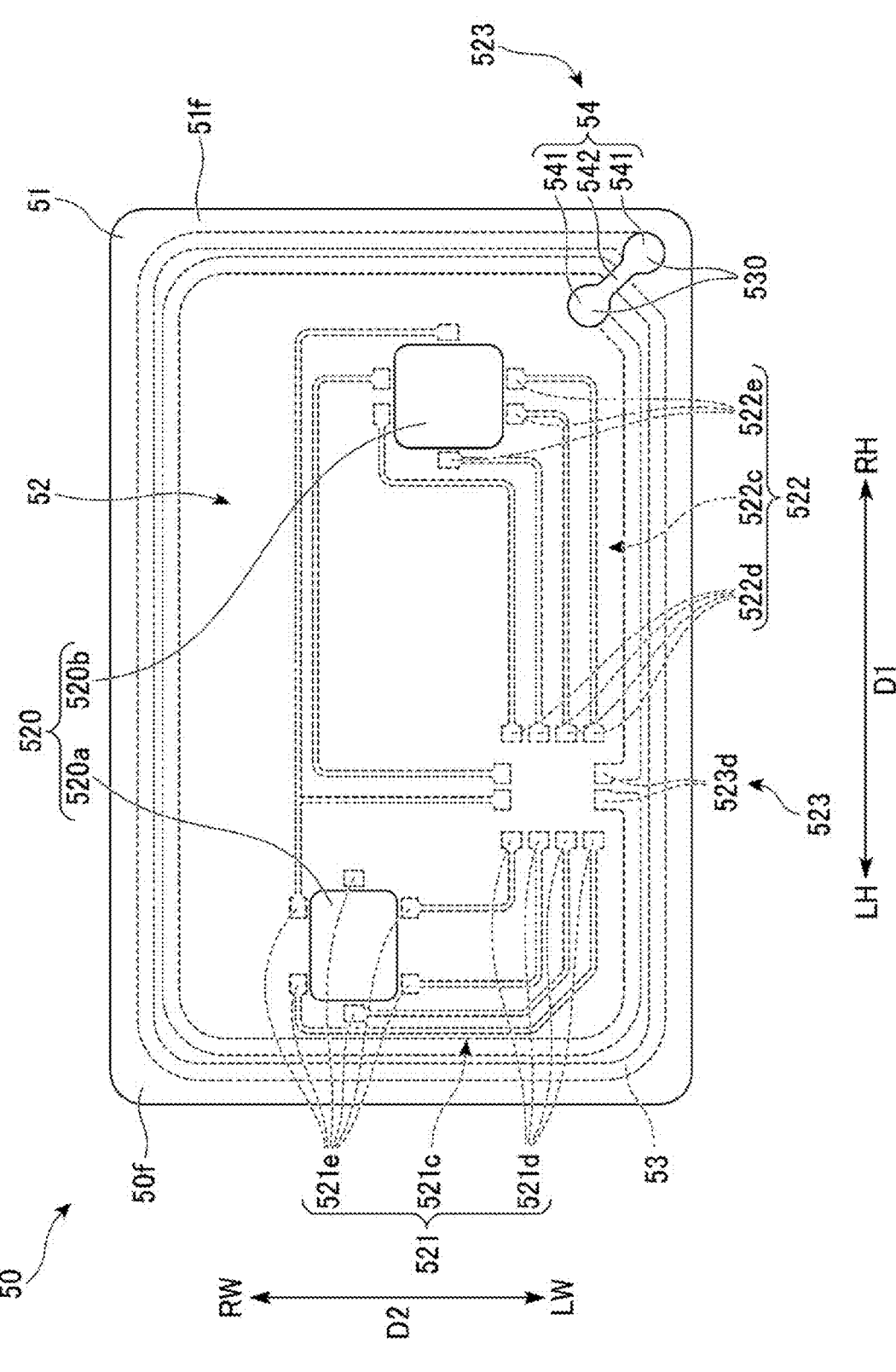
FIG. 3 is a diagram of a sheet circuit board of the IC card according to the first embodiment as viewed from the front surface side.
Figure 4:
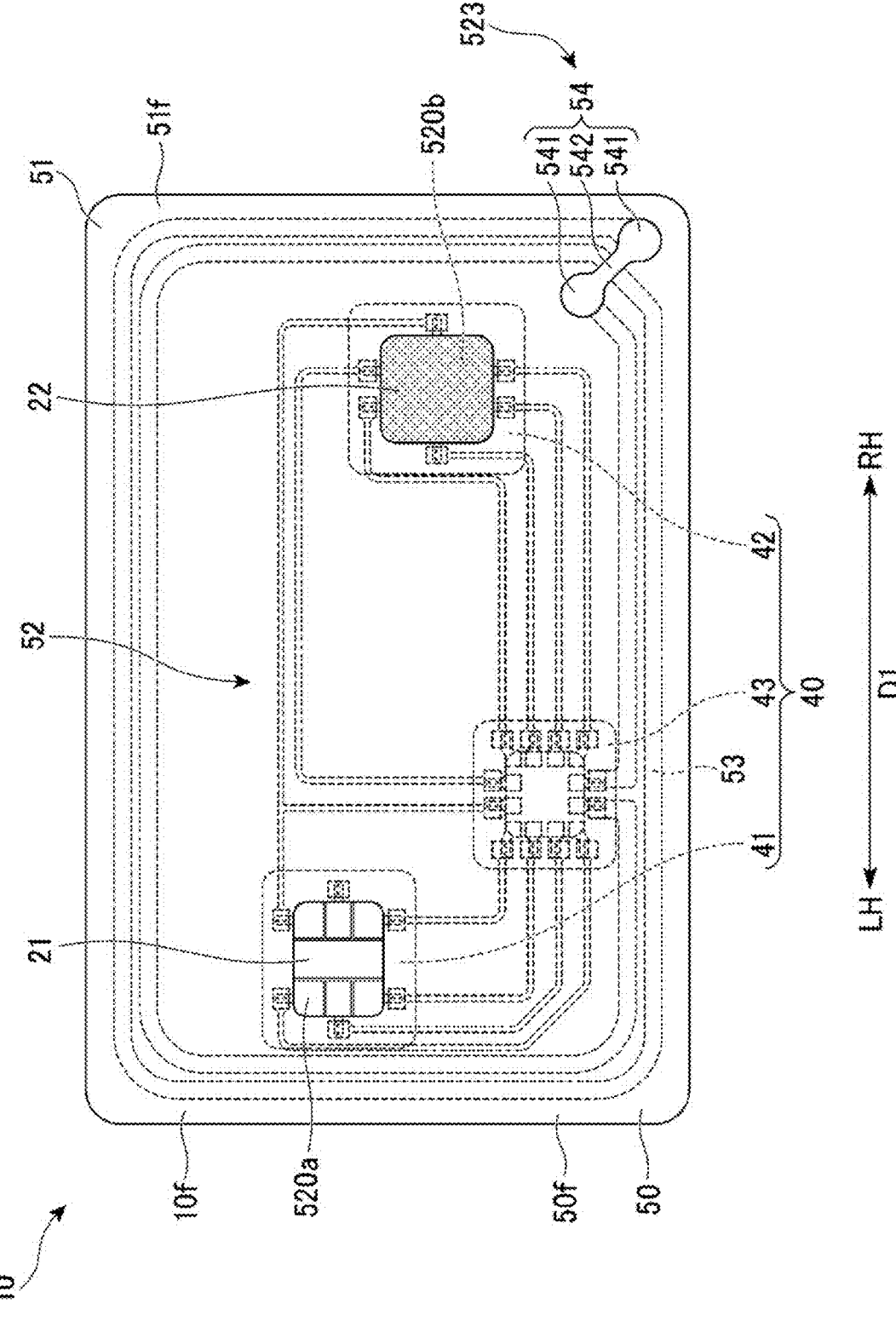
FIG. 4 is a diagram of an inlet of the IC card according to the first embodiment as viewed from the front surface.
Figure 5:
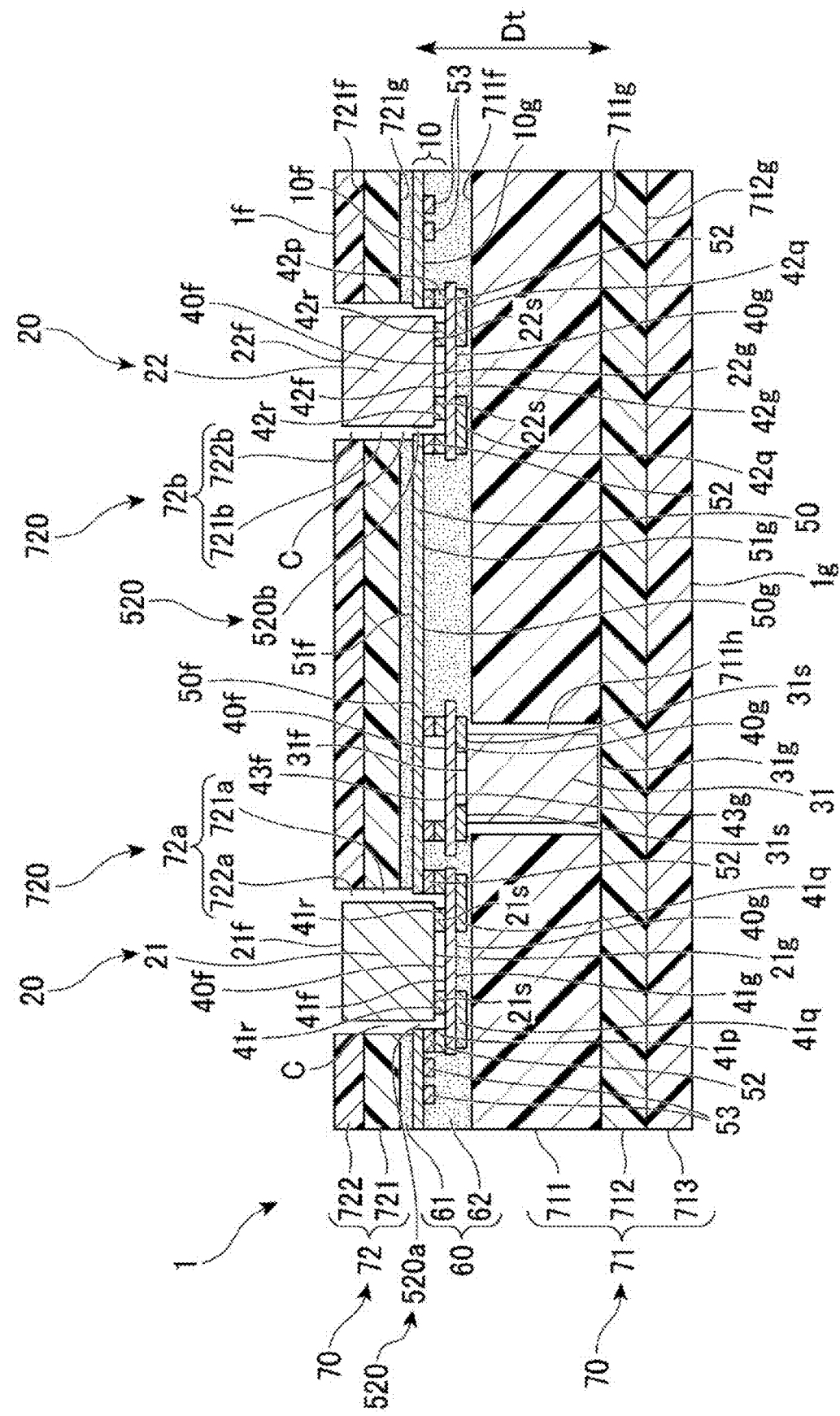
FIG. 5 is a cross-sectional view of the IC card according to the first embodiment.

FIG. 1 is an external view of an IC card 1 as viewed from a front surface 1*f* side according to the first embodiment of the present invention. FIG. 2A is a diagram of a first circuit board 41 having a contact terminal 21 of an IC card 1 according to the first embodiment as viewed from the front surface 41*f* side. FIG. 2B is a diagram of a second circuit board 42 having a fingerprint sensor (biometric authentication sensor) 22 of the IC card 1 according to the first embodiment as viewed from the front surface 42*f* side. FIG. 2C is a diagram of a third circuit board 43 having an IC chip 31 of the IC card 1 according to the first embodiment as viewed from the front surface 43*f* side. FIG. 3 is a diagram of a sheet circuit board 50 of the IC card 1 according to the first embodiment as viewed from the front surface 50*f* side. FIG. 4 is a diagram of an inlet 10 of the IC card 1 according to the first embodiment as viewed from the front surface 10*f* side. FIG. 5 is a cross-sectional view of the IC card 1 according to the first embodiment.

As shown in FIGS. 1 to 5, the IC card (card medium) 1 is a dual interface IC card that includes the contact terminal 21 serving as a contact-type interface and a loop antenna 53 serving as a contactless-type interface. The IC card 1 also has a biometric authentication function provided by a fingerprint sensor 22. The IC card 1 is plate-shaped and has a rectangular shape when viewed in a card thickness direction Dt (see FIG. 5) orthogonal to a front surface 1*f* of the IC card 1. The card thickness direction Dt is a direction having a front surface 1*f* side on which the front surface 1*f* of the IC card 1 is located and a back surface 1*g* side on which a back surface 1*g* is located. The IC card 1 is formed to have a thickness of, for example, about 0.5 to 1.0 mm in the card thickness direction Dt (when the IC card 1 is a credit card, the thickness of the IC card 1 is 0.76 mm).

The IC card 1 is formed using an insulative plastic base material made of, for example, a polyester-based material such as amorphous polyester, a vinyl chloride-based material such as PVC (polyvinyl chloride), a polycarbonate-based material, PET-G (polyethylene terephthalate copolymer), or the like. The IC card 1 may also be formed using a metal sheet, a magnetic material, or the like. Further, the IC card 1 may be molded into a card shape using an insulative plastic material having high fluidity, such as a UV curing material or a material that is cured by mixing and reacting liquid components. As shown in FIG. 5, the IC card 1 includes the inlet 10, an adhesive layer 60, and an exterior base material 70.

In this embodiment, as shown in FIG. 4 or 5, the inlet 10 includes a plurality of circuit boards, components, and the like, and is embedded in the exterior base material 70 coated with the adhesive layer 60. The inlet 10 includes exposed components 20, an internal component 30, circuit boards 40, and the sheet circuit board 50.

As shown in FIG. 1, the exposed components 20 are partially exposed on the front surface 1$f$ of the IC card 1. As shown in FIG. 4, the inlet 10 includes the contact terminal 21 and the fingerprint sensor (biometric authentication sensor) 22 as the exposed components 20. The contact terminal 21 and the fingerprint sensor 22 are both exposed on the front surface 1$f$ side of the IC card 1. The contact terminal 21 is bonded to the front surface 41$f$ of the first circuit board 41 (see FIG. 2), and is placed in a contact terminal opening 72$a$ formed in a front exterior base material 72 of the exterior base material 70 described later. The fingerprint sensor 22 is bonded to a front surface 42$f$ of the second circuit board 42 (see FIG. 2) and is placed in a fingerprint sensor opening 72$b$ formed in the front exterior base material 72 of the exterior base material 70 described later.

As shown in FIGS. 1, 2A, 4, and 5, the contact terminal 21 has a front surface 21$f$ on the front surface 1$f$ side of the IC card 1 and a back surface 21$g$ on the back surface 1$g$ side of the IC card 1. The contact terminal 21 has a rectangular shape when viewed in the card thickness direction Dt. The contact terminal 21 is a module terminal that can be brought into contact with and electrically connected to a contact terminal of a contact-type external device such as an automated teller machine. The contact terminal 21 has a conductive pattern formed by etching or the like on the surface of an insulating base material made of glass epoxy, polyimide (PI), or the like, and is plated with nickel, palladium, gold, or the like. A terminal part (not shown) on the back surface 21$g$ of the contact terminal 21 is bonded to the front surface 41$f$ of the first circuit board 41, which will be described later, with a first conductive bonding material 21$s$ (see FIG. 5). Examples of conductive bonding materials include anisotropic solder and anisotropic conductive film (ACF). In the present invention, anisotropic solder refers to a material having conductive solder particles dispersed in a thermoplastic resin.

As shown in FIGS. 1, 2B, 4, and 5, the fingerprint sensor (biometric authentication sensor) 22 is a semiconductor device that has the front surface 22$f$ and back surface 22$g$ on the front surface 1$f$ side and back surface 1$g$ side of the IC card 1, respectively, and is formed in a rectangular sheet shape when viewed in the card thickness direction Dt. The fingerprint sensor 22 has a configuration in which a protective film is provided to cover a large number of electrodes.

A terminal part (not shown) on the back surface 22$g$ of the fingerprint sensor 22 is bonded to the front surface 42$f$ of the second circuit board 42, which will be described later, with a second conductive bonding material 22$s$ (see FIG. 5). In this embodiment, the second conductive bonding material 22$s$ is the same material as the first conductive bonding material 21$s$. The sensing type of the fingerprint sensor 22 is, for example, an electrostatic capacitance type, an optical type, or an ultrasonic type, but is not limited to these types.

As shown in FIG. 5, the contact terminal 21 and the fingerprint sensor 22 are arranged so that there is are gaps C between them and the inner lateral surface of the openings 720 in the front exterior base material 72. When a metal material is used for the IC card 1, the gaps C are designed so as to prevent electrical short circuit between the exposed components 20 and the IC card 1 and between the conductive bonding materials 21$s$ and 22$s$ and the IC card 1.

As shown in FIGS. 2C, 4, and 5, the internal component 30 is embedded in the exterior base material 70. In this embodiment, the inlet 10 has the IC chip 31 as the interior component 30. The IC chip 31 is electrically coupled to the contact terminal 21, the fingerprint sensor 22, and the loop antenna 53 (described later) via wiring of the sheet circuit board 50.

The IC chip 31 is a so-called secure microcomputer IC. The IC chip 31 has a communication function for communication with the outside via the contact terminal 21 and the loop antenna 53, a fingerprint authentication function provided by the fingerprint sensor 22, and the like. The IC chip 31 has a known configuration having a contact-type communication function and a contactless-type communication function. The IC chip 31 has a first surface 31$f$ on the front surface 1$f$ side of the IC card 1, and a second surface 31$g$ on the back surface 1$g$ side of the IC card 1. The IC chip 31 has a rectangular shape when viewed in the card thickness direction Dt. The IC chip 31 is placed between the contact terminal 21 and the fingerprint sensor 22 in a long side direction D1.

A terminal part (not shown) on the first surface 31$f$ of the IC chip 31 is bonded to a back surface 43$g$ of the third circuit board 43, which will be described later, with a third conductive bonding material 31$s$ (see FIG. 5). In this embodiment, the third conductive bonding material 31$s$ is the same material as the first and second conductive bonding materials 21$s$ and 22$s$. The internal component 30 may be placed integrally with the exposed components 20 described above.

As shown in FIGS. 4 and 5, the circuit boards 40 are embedded in the exterior base material 70 and bonded to a back surface 50$g$ of the sheet circuit board 50 described later. The circuit boards 40 are placed inside an outer edge 1$k$ of the IC card 1 when viewed in the card thickness direction Dt. The circuit boards 40 have a front surface 40$f$ on the front surface 1$f$ side of the IC card 1, and a back surface 40$g$ on the back surface 1$g$ side of the IC card 1. The circuit boards 40 have a rectangular outer shape when viewed in the card thickness direction Dt. For example, the circuit boards 40 have a thickness of 15 to 50 μm (micrometers) in the card thickness direction Dt.

The circuit boards 40 are made of a plastic film using a flexible print circuit (FPC) as the base material. Since such plastic film is bendable, that is, flexible, it enables three-dimensional wiring, circuit connections to a bent part, and the like. The circuit boards 40 are made of an insulating material with good dimensional stability such as polyethylene terephthalate (PET), polyethylene naphthalate (PEN), polycarbonate (PC), or polyimide (PI). Predetermined wiring patterns made of a conductive thin film such as an aluminum or copper thin film is formed by etching or the like on the front surface 40$f$ and back surface 40$g$ of each circuit board 40.

As shown in FIGS. 2 and 5, the circuit boards 40 include the first circuit board 41 for the contact terminal 21, the second circuit board 42 for the fingerprint sensor 22, and the third circuit board 43 for the IC chip 31.

The first circuit board 41 is bonded with the contact terminal 21 on the front surface 41$f$ side. The first circuit board 41 includes first front wiring outer pads 41$p$ and first front wiring inner pads 41$r$ (board wiring part) on the front surface 41$f$, and is electrically connected to the contact terminal 21. The plurality of first front wiring outer pads 41$p$ are arranged, for example, evenly around the contact terminal 21. The first front wiring outer pads 41$p$ are electrically connected to second sheet contact terminal wiring pads 521$e$ of a sheet wiring part 52 of the sheet circuit board 50 described later. The plurality of first front wiring inner pads 41$r$ are evenly arranged on the back surface 21$g$ of the contact terminal 21 and are bonded to the terminal part of the contact terminal 21 via the first conductive bonding material 21s.

The first front wiring outer and inner pads 41p and 41r are electrically connected to a plurality of first back wiring pads 41q provided on the back surface 41g via, for example, through holes penetrating the first circuit board 41 so that the wiring is not exposed in the gap C between the contact terminal 21 and the contact terminal opening 72a of the front exterior base material 72 described later. The first front wiring outer and inner pads 41p and 41r have, for example, a substantially rectangular shape. The first back wiring pads 41q are provided on the back surface 41g of the first circuit board 41 to connect the first front wiring outer and inner pads 41p and 41r via, for example, through holes. The front surface 41f of the first circuit board 41 is attached to the back surface 50g of the sheet circuit board 50 so that the contact terminal 21 passes through a first through hole 520a of the sheet circuit board 50 described later.

The second circuit board 42 is bonded with the fingerprint sensor 22 on the front surface 42f side. The second circuit board 42 includes second front wiring outer pads 42p and second front wiring inner pads 42r (board wiring part) on the front surface 42f and is electrically connected to the fingerprint sensor 22. The plurality of second front wiring outer pads 42p are arranged, for example, evenly around the fingerprint sensor 22. The second front wiring outer pads 42p are electrically connected to second sheet fingerprint sensor wiring pads 522e of the sheet wiring part 52 of the sheet circuit board 50 described later. The plurality of second front wiring inner pads 42r are evenly arranged on the back surface 22g of the fingerprint sensor 22 and are bonded to the terminal part of the fingerprint sensor 22 via the second conductive bonding material 22s. The second front wiring outer and inner pads 42p and 42r are electrically connected to a plurality of second back wiring pads 42q provided on the back surface 42g via, for example, through holes penetrating the second circuit board 42 so that the wiring is not exposed in the gap C between the fingerprint sensor 22 and the fingerprint sensor opening 72b of the front exterior base material 72 described later. The second front wiring outer and inner pads 42p and 42r have, for example, a substantially rectangular shape. The second back wiring pads 42q are provided on the back surface 42g of the second circuit board 42 to connect the second front wiring outer and inner pads 42p and 42r via, for example, through holes. The front surface 42f of the second circuit board 42 is attached to the back surface 50g of the sheet circuit board 50 so that the fingerprint sensor 22 passes through a second through hole 520b of the sheet circuit board 50 described later.

The third circuit board 43 is bonded with the IC chip 31 on the back surface 43g side. The third circuit board 43 includes a plurality of third front wiring pads 43p on a front surface 43f. The plurality of third front wiring pads 43p are arranged, for example, evenly around the IC chip 31. The third front wiring pads 43p are electrically connected to first sheet contact terminal wiring pads 521d, first sheet fingerprint sensor wiring pads 522d, and sheet antenna wiring pads 523d of the sheet wiring part 52 of the sheet circuit board 50 described later. The third front wiring pads 43p are connected to a plurality of third back wiring pads 43q provided on the back surface 43g via, for example, through holes penetrating the third circuit board 43. The plurality of third back wiring pads 43q are electrically connected to the terminal part of the IC chip 31 via the third conductive bonding material 31s. The third front wiring pads 43p have, for example, a substantially rectangular shape. The third circuit board 43 is placed on the back surface 50g of the sheet circuit board 50 described later so that the wiring pads of the sheet wiring part are bonded to the third front wiring pads 43p. Further, the third circuit board 43 is connected to the back surface 50g of the sheet circuit board 50 so that the IC chip 31 is located between the first and second through holes 520a and 520b of the sheet body 51 described later. At this time, the IC chip 31 is, with respect to the first and second through holes 520a and 520b, offset toward one side (LW side) in a short side direction D2 orthogonal to the long side direction D1 in a plane extending along the front surface 1f of the IC card 1.

As shown in FIGS. 2 and 5, the circuit boards 40 are closer to the back surface 1g of the IC card 1 than the sheet circuit board 50 described later is in the card thickness direction Dt. As shown in FIGS. 2B and 5, the contact terminal 21 is mounted on the front surface 41f of the first circuit board 41 facing towards the front surface 1f side of the IC card 1, and the fingerprint sensor 22 is mounted on the front surface 42f of the second circuit board 42.

The IC chip 31 is mounted on the back surface 43g of the third circuit board 43 facing towards the back surface side of the IC card 1 as shown in FIGS. 2C and 5. The contact terminal 21, the fingerprint sensor 22, and the IC chip 31 are mounted on the respective circuit boards by soldering, conductive adhesive, thermal bonding, or the like.

As shown in FIGS. 3 to 5, the sheet circuit board 50 includes the sheet body 51, the sheet wiring part 52, and the loop antenna 53.

The sheet body 51 (sheet) is a flexible insulating board embedded in the exterior base material 70. The sheet body 51 has a front surface 51f on the front surface 1f side of the IC card 1, and a back surface 51g on the back surface 1g side of the IC card 1. The sheet body 51 is made of a plastic film using a flexible print circuit (FPC) as the base material. In this embodiment, the sheet body 51 is formed of a material similar to that of the circuit boards 40. The sheet body 51 further includes a through hole 520 (sheet through hole).

The IC chip 31 is placed on the back surface 50g side of the sheet circuit board 50 and in a first card base material 711, which will be described later.

The IC chip 31 is placed between the contact terminal 21 and the fingerprint sensor 22 in the long side direction D1. That is, the contact terminal 21, the fingerprint sensor 22, and the IC chip 31 are arranged so as not to overlap when viewed in the card thickness direction Dt.

Further, in a case where the height position of the contact terminal 21 in the card thickness direction Dt is to be changed, the height position of the contact terminal 21 can be adjusted by several tens of μm by, for example, changing the thickness of the first front wiring inner pads 41r. In this embodiment, since the contact terminal 21 and the IC chip 31 are arranged so as not to overlap when viewed in the card thickness direction Dt, the height position of the contact terminal 21 in the card thickness direction Dt can be adjusted to any height without affecting the IC chip 31.

Further, in a case where the height position of the fingerprint sensor 22 in the card thickness direction Dt is to be changed, the height position of the fingerprint sensor 22 can be adjusted by several tens of μm by, for example, changing the thickness of the second front wiring inner pads 42r. In this embodiment, since the fingerprint sensor 22 and the IC chip 31 are arranged so as not to overlap when viewed in the card thickness direction Dt, the height position of the fingerprint sensor 22 in the card thickness direction Dt can be adjusted to any height without affecting the IC chip 31.

The through holes 520 are holes for allowing the contact terminal 21 and the fingerprint sensor 22, i.e., exposed components, to be exposed on the front surface 50*f* of the sheet circuit board 50 when the back surface 50*g* of the sheet circuit board 50 is bonded to the front surface 41*f* of the first circuit board 41, the front surface 42*f* of the second circuit board 42, and the front surface 43*f* of the third circuit board 43. Two through holes 520 are formed, namely the first and second through holes 520*a* and 520*b*.

The contact terminal 21 is accommodated in the first through hole 520*a*. The fingerprint sensor 22 is accommodated in the second through hole 520*b*. The through holes 520 penetrate the sheet body 51 in the card thickness direction Dt. Each through hole 520 has a size that allows the contact terminal 21 or the fingerprint sensor 22 to pass through it. The positions of the contact terminal 21 and fingerprint sensor 22 provided on the respective circuit boards can be easily determined by passing them through the through holes 520 from the back surface 50*g* side of the sheet circuit board 50. The first through hole 520*a* is formed in the sheet body 51 on one side (LH side) in the long side direction D1 extending along the front surface 1*f* of the IC card 1 with respect to the center part of the front surface 1*f* of the IC card 1. The second through hole 520*b* is formed in the sheet body 51 on the other side (RH side) in the long side direction D1 of the IC card 1 with respect to the center part of the front surface 1*f* of the IC card 1.

The sheet wiring part 52 is a wiring part that electrically connects the contact terminal 21, the fingerprint sensor 22, and the IC chip 31. The sheet wiring part 52 includes contact terminal wiring parts 521 that electrically connect the IC chip 31 and the contact terminal 21, fingerprint sensor wiring parts 522 that electrically connects the IC chip 31 and the fingerprint sensor 22, and an antenna wiring part 523 that electrically connects the IC chip 31 and the loop antenna 53.

The plurality of contact terminal wiring parts 521 are provided on the back surface 51*g* of the sheet body 51 and electrically couple (connect) the IC chip 31 and the contact terminal 21. As shown in FIGS. 3 to 5, the contact terminal wiring parts 521 include first sheet contact terminal wiring pads 521*d*, second sheet contact terminal wiring pads 521*e*, and a contact terminal wiring 521*c*. When the back surface 50*g* of the sheet circuit board 50 and the front surface 43*f* of the third circuit board 43 provided with the IC chip 31 are bonded, the first sheet contact terminal wiring pads 521*d* are located at substantially the same positions as the third front wiring pads 43*p* of the third circuit board 43 and thus overlap therewith when viewed in the card thickness direction Dt. The first sheet contact terminal wiring pads 521*d* are bonded to the third front wiring pads 43*p* of the third circuit board 43 and have a substantially rectangular shape. When the back surface 50*g* of the sheet circuit board 50 and the front surface 41*f* of the first circuit board 41 provided with the contact terminal 21 are bonded, the second sheet contact terminal wiring pads 521*e* are located at substantially the same positions as the first front wiring outer pads 41*p* of the first circuit board 41 and thus overlap therewith when viewed in the card thickness direction Dt. The second sheet contact terminal wiring pads 521*e* are bonded to the first front wiring pads 41*p* of the first circuit board 41 and have a substantially rectangular shape. The contact terminal wiring 521*c* connects the first sheet contact terminal wiring pads 521*d* and the second sheet contact terminal wiring pads 521*c*.

The plurality of fingerprint sensor wiring parts 522 are provided on the back surface 51*g* of the sheet body 51 and electrically couple the IC chip 31 and the fingerprint sensor

22. As shown in FIGS. 3 to 5, the fingerprint sensor wiring parts 522 include first sheet fingerprint sensor wiring pads 522*d*, second sheet fingerprint sensor wiring pads 522*e*, and a fingerprint sensor wiring 522*c*. When the back surface 50*g* of the sheet circuit board 50 and the front surface 43*f* of the third circuit board 43 provided with the IC chip 31 are bonded, the first sheet fingerprint sensor wiring pads 522*d* are located at substantially the same positions as the third front wiring pads 43*p* of the third circuit board 43 and thus overlap therewith when viewed in the card thickness direction Dt. The first sheet fingerprint sensor wiring pads 522*d* are bonded to the third front wiring pads 43*p* of the third circuit board 43 and have a substantially rectangular shape. When the back surface 50*g* of the sheet circuit board 50 and the front surface 42*f* of the second circuit board 42 provided with the fingerprint sensor 22 are bonded, the second sheet fingerprint sensor wiring pads 522*e* are located at substantially the same positions as the second front wiring outer pads 42*p* of the second circuit board 42 and thus overlap therewith when viewed in the card thickness direction Dt. The second sheet fingerprint sensor wiring pads 522*e* are bonded to the second front wiring outer pads 42*p* of the second circuit board 42 and have a substantially rectangular shape. The fingerprint sensor wiring 522*c* connects the first sheet fingerprint sensor wiring pads 522*d* and the second sheet fingerprint sensor wiring pads 522*c*.

The plurality of antenna wiring parts 523 are provided on the front surface 51*f* and the back surface 51*g* of the sheet body 51 and electrically couple the IC chip 31 with the loop antenna 53 described later. As shown in FIGS. 2 and 5, the antenna wiring parts 523 include sheet antenna wiring pads 523*d* placed near the middle of the loop antenna 53, and a jumper wiring part 54.

When the back surface 50*g* of the sheet circuit board 50 and the front surface 43*f* of the third circuit board 43 provided with the IC chip 31 are bonded, the sheet antenna wiring pads 523*d* are located at substantially the same positions as the third front wiring pads 43*p* of the third circuit board 43 and thus overlap therewith when viewed in the card thickness direction Dt. The sheet antenna wiring pads 523*d* are located in the central part of the loop antenna 53 and electrically connected to the IC chip 31. The sheet antenna wiring pads 523*d* are bonded to the third front wiring pads 43*p* of the third circuit board 43 and have a substantially rectangular shape.

As shown in FIGS. 3 and 4, the jumper wiring part 54 is formed on the front surface 51*f* of the sheet body 51 and includes a jumper wiring connection parts 541 and a jumper wiring 542. The jumper wiring connection parts 541 are provided at opposite ends of the loop antenna 53 and have a substantially circular shape. The jumper wiring connection parts 541 are electrically connected to the terminal part 530 of the loop antenna 53 provided on the back surface 51*g* of the sheet body 51 by, for example, crimping and through holes. The jumper wiring 542 connects the jumper wiring connection parts 541 provided at opposite ends of loop antenna 53.

As shown in FIGS. 3 to 5, the loop antenna 53 is formed on the back surface 51*g* of the sheet body 51. The loop antenna 53 is a patterned antenna for contactless-type communication formed by, for example, etching an aluminum thin film into a substantially rectangular spiral shape. The area of the inner end of the loop antenna 53 is expanded into a substantially circular shape so that the terminal part 530 is formed at the inner end of the loop antenna 53. The terminal part 530 is drawn out toward a corner of the sheet body 51. This terminal part 530 is electrically connected to the jumper wiring connection parts 541 provided on the front surface 51*f* of the sheet body 51. The bent parts (corners of the rectangle) of the loop antenna 53 are formed in a substantially arc shape. Instead of the etching mentioned above, the loop antenna 53 may be formed by printing, by using a wire coil, or the like.

The loop antenna 53 may be configured separately from the sheet body 51. When the loop antenna 53 is configured separately from the sheet body 51, the loop antenna 53 can be formed, for example, by providing a metal plate, metal foil, or metal wire formed into a certain antenna shape. In this case, the wiring patterns of the loop antenna 53 and the sheet body 51 are bonded by soldering, welding, pressure welding, or the like.

The adhesive layer 60 is an adhesive layer applied to the exterior base material 70 as shown in FIG. 5. The adhesive layer 60 includes first and second adhesive layers 61 and 62. The first adhesive layer 61 is interposed between the inlet 10 and the front exterior base material 72 and bonds them together. The second adhesive layer 62 is interposed between the inlet 10 and the back exterior base material 71 and bonds them together. The material of the adhesive layer 60 is, for example, polyvinyl acetate resin, ethylene-vinyl acetate copolymer resin, vinyl chloride-vinyl acetate copolymer resin, acrylic resin, polyester resin, polyamide resin, polyurethane resin, or nitrocellulose.

As shown in FIG. 5, the exterior base material 70 is formed using an insulative plastic base material made of, for example, a polyester-based material such as amorphous polyester, a vinyl chloride-based material such as PVC (polyvinyl chloride), a polycarbonate-based material, PET-G (polyethylene terephthalate copolymer), or the like. The exterior base material 70 includes the back exterior base material (lower exterior base material) 71 and the front exterior base material (upper exterior base material) 72.

The back exterior base material 71 is a card base material placed on the back surface 1*g* side of the IC card 1. The back exterior base material 71 includes a first card base material 711, a third card base material 712, and a fifth card base material 713.

The front exterior base material 72 is a card base material placed on the front surface 1*f* side of the IC card 1. The front exterior base material 72 includes a second card base material 721 and a fourth card base material 722.

The second adhesive layer 62 is applied to a front surface 711*f* of the first card base material 711, and the first card base material 711 is laminated on the back surface 10*g* of the inlet 10. The first card base material 711 has approximately the same thickness as the IC chip 31 or is thicker than the IC chip 31 by several tens of μm when viewed in the card thickness direction Dt. The first card base material 711 is provided with a recess 711*h* that is large enough to insert and accommodate the IC chip 31. The third card base material 712 is laminated on the back surface 711*g* of the first card base material 711. The fifth card base material 713 is further laminated on the back surface 712*g* of the third card base material 712. Note that the recess 711*h* may be a through hole that penetrates the first card base material 711.

The first adhesive layer 61 is applied to a back surface 721*g* of the second card base material 721, and the second card base material 721 is laminated on the front surface 10*f* of the inlet 10. The fourth card base material 722 is further laminated on the front surface 721*f* of the second card base material 721.

The front exterior base material 72 includes openings 720 that accommodate the exposed components 20. The front exterior base material 72 has a contact terminal opening 72*a* that accommodates the contact terminal 21, which is an exposed component 20. The front exterior base material 72 also has a fingerprint sensor opening 72*b* that accommodates the fingerprint sensor 22, which is an exposed component 20. The contact terminal opening 72*a* includes a first opening 721*a* in the second card base material 721 and a second opening 722*a* in the fourth card base material 722. The fingerprint sensor opening 72*b* includes a third opening 721*b* in the second card base material 721 and a fourth opening 722*b* in the fourth card base material 722.

The first opening (exterior through hole) 721*a* accommodates the contact terminal 21. The first opening 721*a* penetrates the second card base material 721 in the card thickness direction Dt. The first opening 721*a* is set to be located at substantially the same position as the first through hole 520*a* so that they overlap when the front exterior base material 72 is bonded to the front surface 50*f* of the sheet circuit board 50. Further, the first opening 721*a* is set to be slightly larger than the first through hole 520*a*.

The second opening (exterior through hole) 722*a* accommodates the contact terminal 21. The second opening 722*a* penetrates the fourth card base material 722 in the card thickness direction Dt. The second opening 722*a* is set to be located at substantially the same position as the first opening 721*a* so that they overlap when the front exterior base material 72 is bonded to the front surface 50*f* of the sheet circuit board 50. Further, the second opening 722*a* is set to be approximately the same as the first opening 721*a*.

The third opening 721*b* accommodates the fingerprint sensor 22. The third opening 721*b* penetrates the second card base material 721 in the card thickness direction Dt. The third opening 721*b* is set to be located at substantially the same position as the second through hole 520*b* so that they overlap when the front exterior base material 72 is bonded to the front surface 50*f* of the sheet circuit board 50. Further, the third opening 721*b* is set to be slightly larger than the second through hole 520*b*.

The fourth opening 722*b* accommodates the fingerprint sensor 22. The fourth opening 722*b* penetrates the fourth card base material 722 in the card thickness direction Dt. The fourth opening 722*b* is set to be located at substantially the same position as the third opening 721*b* so that they overlap when the front exterior base material 72 is bonded to the front surface 50*f* of the sheet circuit board 50. Further, the fourth opening 722*b* is set to be approximately the same as the third opening 721*b*.

With this configuration, the gaps C can be formed between the contact terminal 21 and the inner lateral surface of the opening 720 and between the fingerprint sensor 22 and the opening 720. The gaps C are designed so as to prevent electrical short circuit between the exposed components 20 and the IC card and between the conductive bonding materials and the IC card. This allows the IC card 1 to be made of a metal material.

The exterior base material 70 is provided to the IC card 1 by, for example, the following manufacturing method.

First, the first and second card base materials 711 and 721 are stacked on the inlet 10 with the adhesive layer 60 applied thereto. The third card base material 712 is stacked on the back surface 711*g* of the first card base material 711. Then, the first to third card base materials 711, 721, and 712 are laminated by, for example, hot pressing to integrate them with the inlet 10. Next, the fourth card base material 722 is stacked on the front surface 721*f* of the second card base material 721, and the fifth card base material 713 is stacked on the back surface 712*g* of the third card base material 712. Then, similarly to the above, the fourth and fifth card base materials 722 and 713 are laminated by hot pressing to integrate them with the inlet 10. The assembly of the exterior base material 70, the adhesive layer 60, and the inlet 10 are die-cut and divided into individual pieces. The IC card 1 is formed by this manufacturing method. Note that the IC card 1 may be integrated by a converting process using an adhesive or the like. It is also possible to integrate the exterior base material 70 by cold lamination using a two-component curing resin, a room temperature curing resin, or a UV curing resin.

In this embodiment, with the above configuration, the contact terminal 21 and the fingerprint sensor 22, which are the exposed components 20 included in the inlet 10, and the IC chip 31, which is the internal component 30, are bonded to the respective circuit boards. The inlet 10 includes a plurality of circuit boards, each of which is bonded to the sheet circuit board 50 at a predetermined position. In particular, the contact terminal 21 and the fingerprint sensor 22, which are the exposed components 20, are bonded so that they penetrate into the first and second through holes 520a and 520b already arranged in the sheet circuit board 50. Therefore, the respective circuit boards 40 including the contact terminal 21 and the fingerprint sensor 22, which are the exposed components 20, and the IC chip 31, which is the internal component 30, can be easily and accurately mounted on the sheet circuit board 50.

By changing the thickness of the first front wiring inner pads 41r, the height position of the contact terminal 21 can be adjusted, and by changing the thickness of the second front wiring inner pads 42r, the height position of the fingerprint sensor 22 can be adjusted. Therefore, during the formation of the IC card 1 by laminating the exterior base material 70 on the inlet 10, the height positions of the contact terminal 21 and the fingerprint sensor 22 can be independently adjusted as desired in the respective circuit boards with respect to the sheet circuit board 50 of the inlet 10 within the range of the thickness of the IC card 1.

Further, in this embodiment, the sheet circuit board 50 has the through holes 520. The respective circuit boards 40 to which the contact terminal 21 and the fingerprint sensor 22, which are the exposed components 20, are bonded are aligned with the through holes 520 of the sheet circuit board 50 so that the contact terminal 21 and the fingerprint sensor 22 are exposed. Therefore, during the formation of the IC card 1 by laminating the exterior base material 70 on the inlet 10, the exposed components 20 and the internal component 30 can be easily and accurately mounted in the openings 720 of the front exterior base material 72 and the recess 711h of the back exterior base material 71 of the exterior base material 70.

Further, since the size of the first opening 721a is larger than the size of the first through hole 520a, the contact terminal 21 can be reliably inserted into the first opening 721a by passing the contact terminal 21 through the first through hole 520a. This allows the contact terminal 21 to be placed accurately. Similarly, since the size of the second opening 722a is larger than the size of the second through hole 520b, the fingerprint sensor 22 can be reliably inserted into the second opening 722a by passing the fingerprint sensor 22 through the through hole 520b. This allows the fingerprint sensor 22 to be placed accurately.

Note that the present invention is not limited to the above embodiment and can be appropriately modified within a range not departing from the spirit of the present invention.

Second Embodiment

Figure 6:
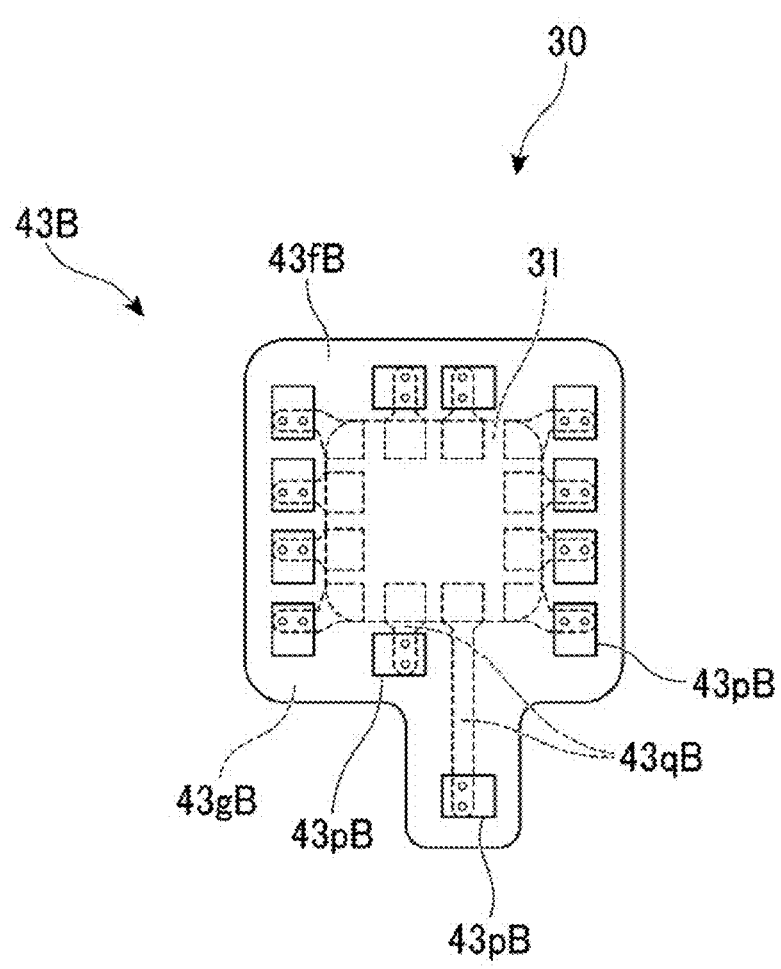
FIG. 6 is a diagram of a circuit board having a secure microcomputer IC of the IC card according to the second embodiment of the present invention as viewed from the front surface side.

Next, a second embodiment of the present invention will be described with reference to FIGS. 6 to 8. In the following description, members that are common to those described above are denoted by the same reference signs, and duplicated description thereof will be omitted. The following embodiments all have inlets that are different from that of the first embodiment. Therefore, the following description will focus on the differences from the first embodiment. An inlet 10B embedded in the IC card (not shown) according to the second embodiment of the present invention includes the exposed components 20, the internal component 30, circuit boards 40B, and a sheet circuit board 50B.

The circuit boards 40B includes first to third circuit boards 41, 42, and 43B for the contact terminal 21, the fingerprint sensor 22, and the IC chip 31, respectively. Since the first and second circuit boards 41 and 42 are both the same as those in the first embodiment, their description will be omitted.

The third circuit board 43B is bonded with the IC chip 31 on the back surface 43gB side. The third circuit board 43B includes a plurality of third front wiring pads 43pB on a front surface 43fB. Instead of the sheet antenna wiring pads 523d connected to the third front wiring pads 43p of the first embodiment, the third front wiring pads 43pB are electrically connected to terminal parts 530B of a loop antenna 53B.

Two third front wiring pads 43pB connected to the terminal parts 530B of the loop antenna 53B are provided on the third circuit board 43B. One of the third front wiring pads 43pB connected to the terminal parts 530B is placed near the IC chip 31 to connect it to an inner terminal part 530Ba, which is the inner terminal part 530B of the loop antenna 53B. The other one of the third front wiring pads 43pB connected to the terminal parts 530B is placed at a distance from the IC chip 31 to connect it to an outer terminal part 530Bb, which is the outer terminal part 530B of the loop antenna 53B. With this configuration, since the third front wiring pads 43pB are electrically connected to the inner and outer terminal parts 530Ba and 530Bb, the third circuit board 43B can have the function of the jumper wiring part 54 of the antenna wiring part 523 of the sheet circuit board 50 according to the first embodiment.

Figure 7:
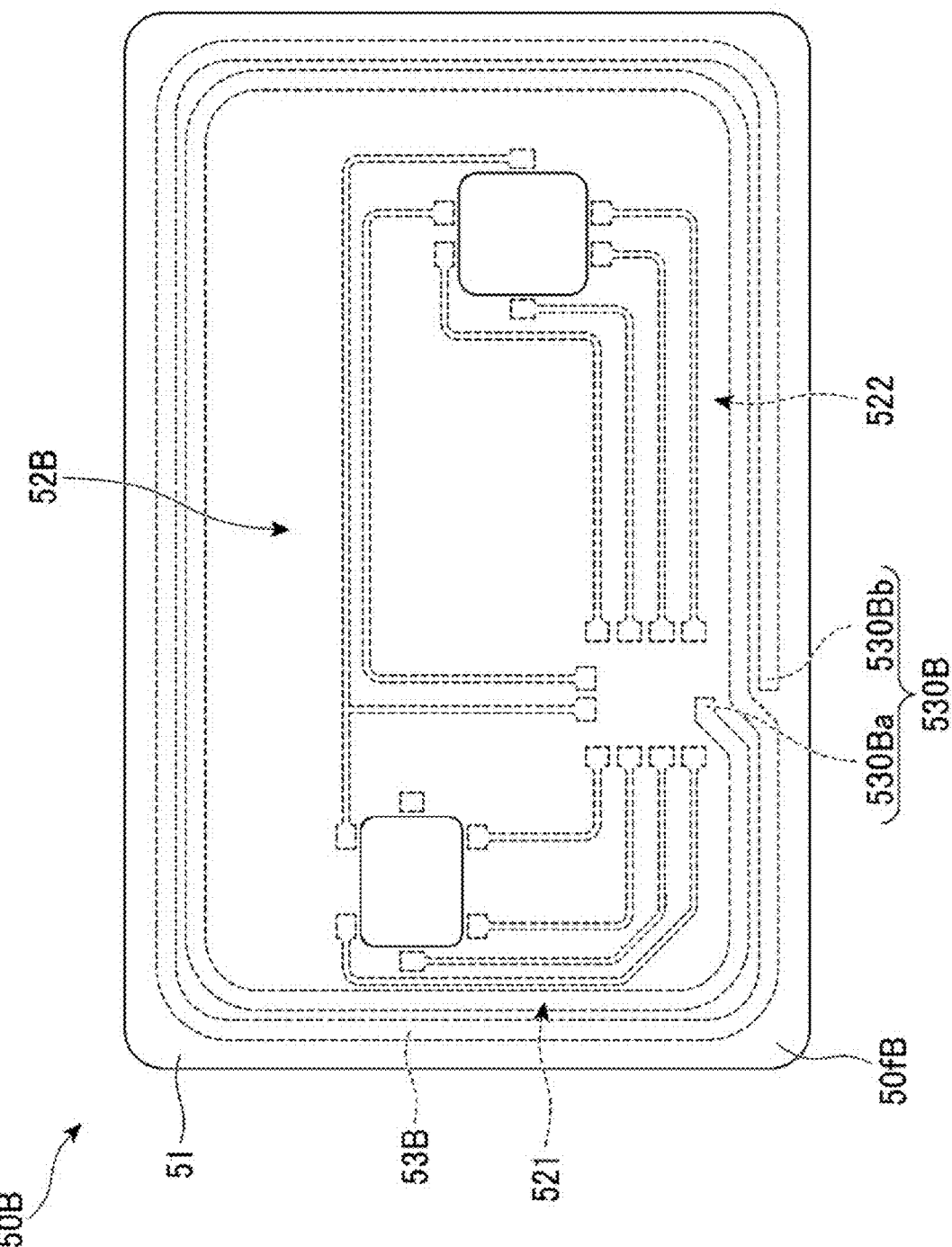
FIG. 7 is a diagram of a sheet circuit board of the IC card according to the second embodiment as viewed from the front surface side.
Figure 8:
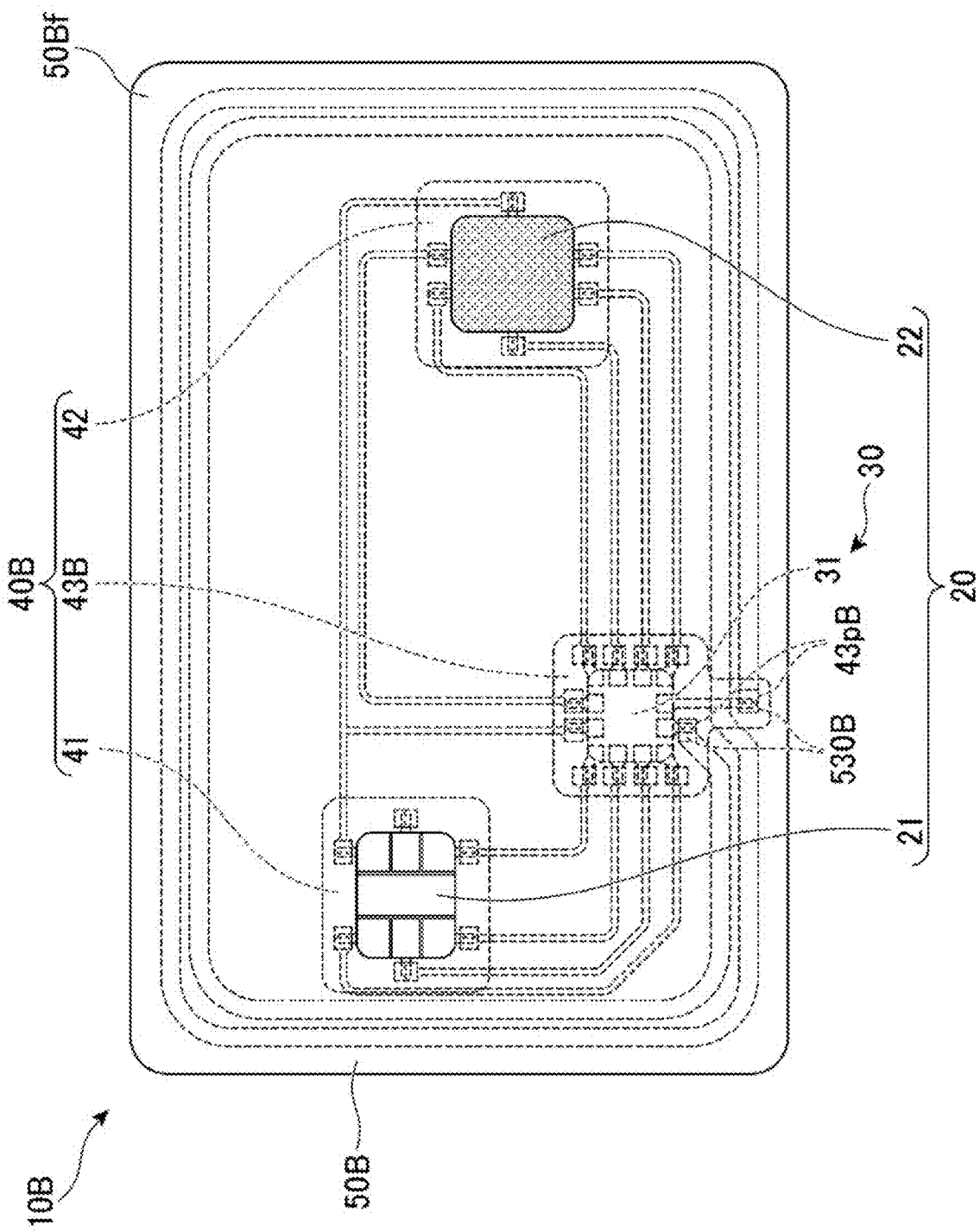
FIG. 8 is a diagram of an inlet of the IC card according to the second embodiment as viewed from the front surface.

As shown in FIG. 7, the sheet circuit board 50B includes the sheet body 51, a sheet wiring part 52B, and the loop antenna 53B. Since the sheet body 51 is the same as that in the first embodiment, description thereof will be omitted. The sheet wiring part 52B includes the contact terminal wiring parts 521 and the fingerprint sensor wiring parts 522, but does not include the antenna wiring part 523 compared to the first embodiment.

The loop antenna 53B is formed in a substantially rectangular spiral shape so as not to overlap, and the terminal parts 530B are formed at opposite ends thereof. The terminal parts 530B includes, on the sheet circuit board 50B, the inner and outer terminal parts 530Ba and 530Bb on the inner side and outer side, respectively. Each of the inner and outer terminal parts 530Ba and 530Bb is placed so as to overlap with the corresponding third front wiring pad 43pB of the third circuit board 43B. These terminal parts 530B are electrically connected to the third front wiring pads 43pB.

In this embodiment, the above configuration makes it possible to eliminate the jumper wiring part 54 provided on the front surface 50f of the sheet circuit board 50 in the first embodiment owing to the third circuit board 43B having the function of the jumper wiring. Therefore, the sheet circuit board 50B can be easily manufactured without the need to provide a wiring on the front surface 50fB of the sheet circuit board 50B.

Further, in this embodiment, since the jumper wiring part 54 in the first embodiment is not required, the sheet circuit board 50B can have fewer contacts. This improves efficiency because the time required for manufacturing the sheet circuit board 50B can be reduced. Furthermore, the sheet circuit board 50B can reduce the cost of the jumper wiring part 54 in the first embodiment. Since the sheet circuit board 50B does not have contact points for the jumper wiring part 54, the risk of contact failure can be reduced.

Third Embodiment

Figure 9:
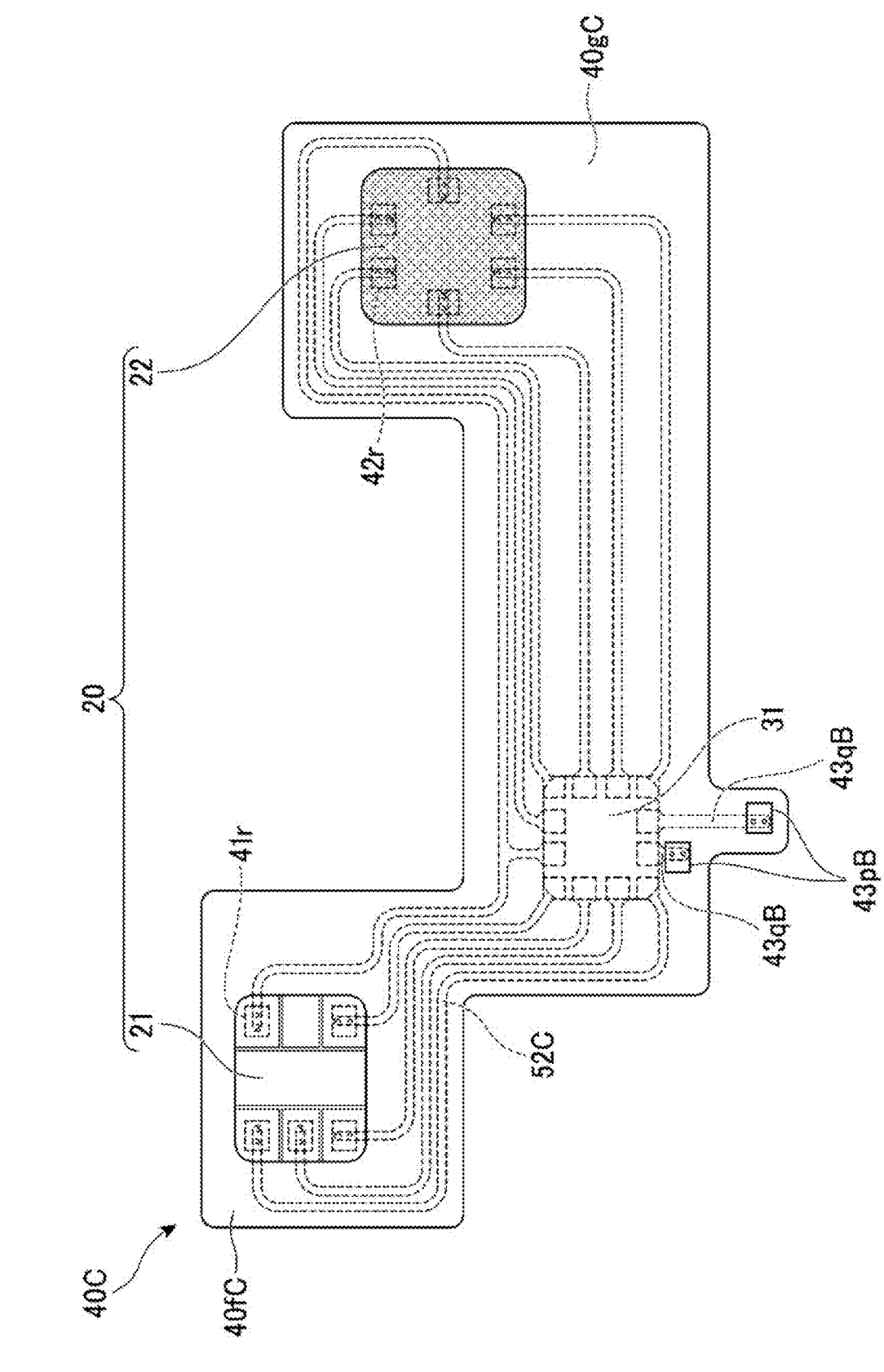
FIG. 9 is a diagram of a circuit board having various components of the IC card according to the third embodiment of the present invention as viewed from the front surface side.
Figure 10:
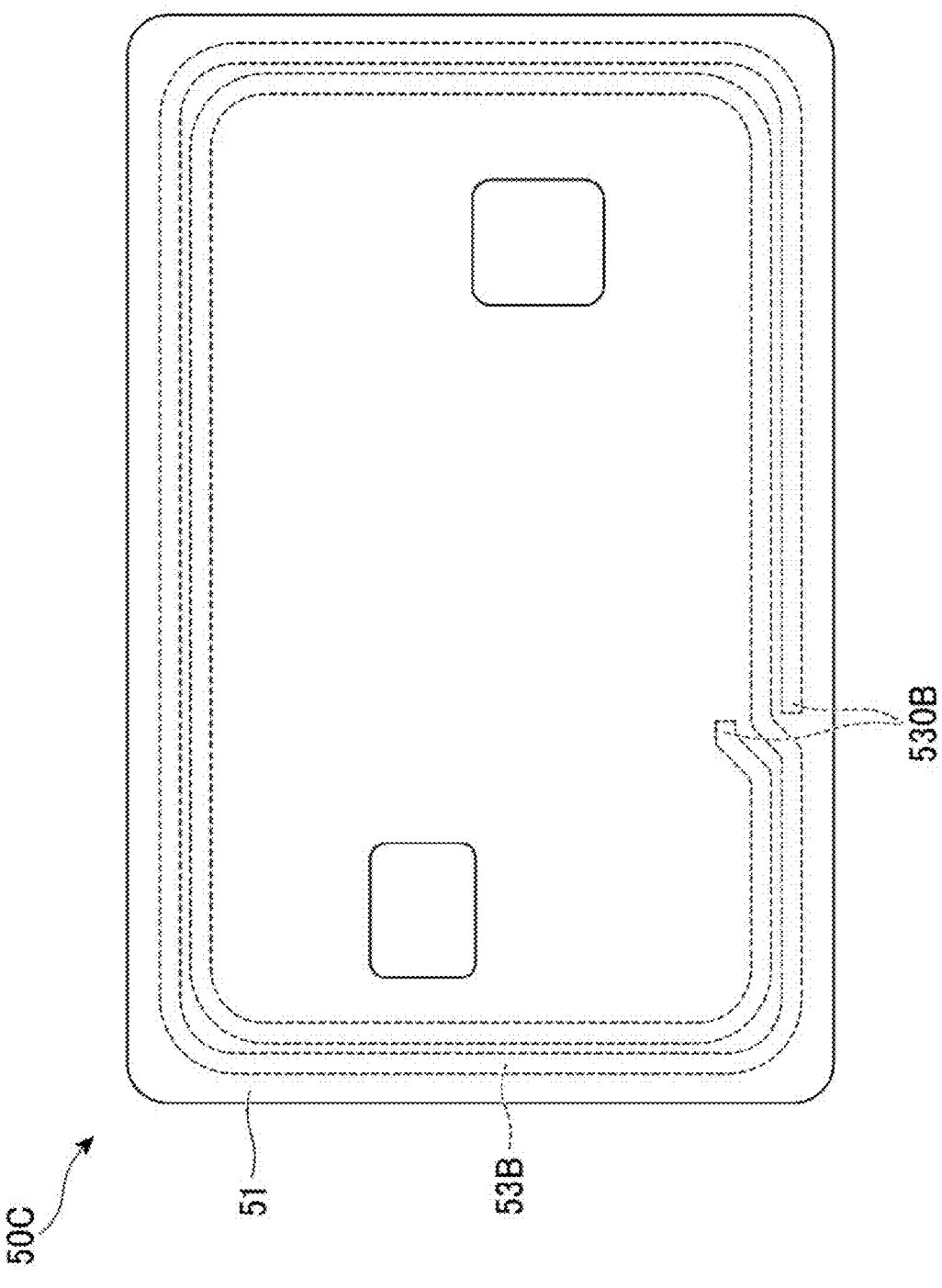
FIG. 10 is a diagram of a sheet circuit board of the IC card according to the third embodiment as viewed from the front surface side.
Figure 11:
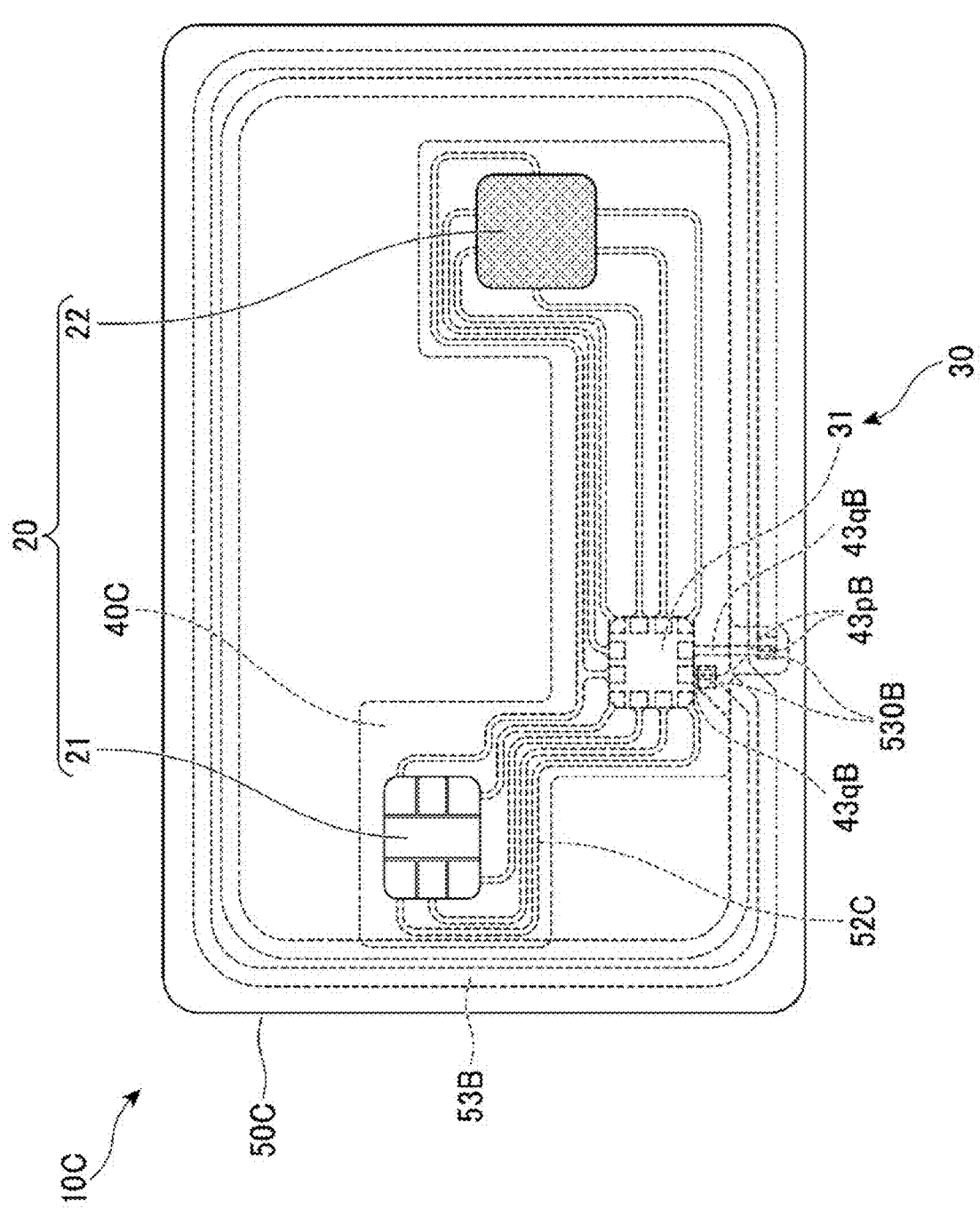
FIG. 11 is a diagram of an inlet of the IC card according to the third embodiment as viewed from the front surface.

Next, a third embodiment of the present invention will be described with reference to FIGS. 9 to 11. In all of the following embodiments, the circuit board and sheet circuit board of the inlet are different from those of the second embodiment. As shown in FIGS. 9 to 12, an inlet 10C embedded in the IC card (not shown) according to the third embodiment of the present invention includes the exposed components 20, the internal component 30, a circuit board 40C, and a sheet circuit board 50C.

The circuit board 40C is a single board combining all the functions of the first and second circuit boards 41 and 42 of the first embodiment, and the third circuit board 43B of the second embodiment. The circuit board 40C includes the exposed components 20 on a front surface 40fC, and the internal component 30 on a back surface 40gC. Further, the circuit board 40C includes a sheet wiring part 52C and the third back wiring pads 43qB on the back surface 40gC. The sheet wiring part 52C are electrically connected to the first front wiring inner pads 41r (board wiring part) and the second front wiring inner pads 42r (board wiring part) arranged on the front surface 40fC of the circuit board 40C via, for example, through holes penetrating the circuit board 40C. The third back wiring pads 43qB are electrically connected to the two third front wiring pads 43pB connected to the terminal parts 530B of the loop antenna 53B via, for example, through holes penetrating the circuit board 40C. The circuit board 40C is set to have a size that allows the exposed components 20 to be located on the front surface 40fC, and the internal component 30 and the sheet wiring part 52C to be located on the back surface 40gC.

The sheet circuit board 50C includes the sheet body 51 and the loop antenna 53B. In the second embodiment, the sheet wiring part 52B was provided on the sheet circuit board 50B, but the sheet wiring part 52C is provided on the circuit board 40C in this embodiment.

In this embodiment, there is no need to provide the jumper wiring part 54 on the front surface 51f of the sheet body 51 in the first embodiment owing to the circuit board 40C having the function of the jumper wiring. Therefore, the sheet circuit board 50C can be easily manufactured without the need to provide the sheet body 51 with a wiring on the front surface 51f. Since the sheet circuit board 50C does not have contact points for the jumper wiring part 54, the risk of contact failure can be reduced.

The present embodiment has an improved efficiency since, according to the sheet circuit board 50C, the exposed components 20 and the internal component 30 are provided on a single circuit board 40C, and thus the time and cost required for manufacturing the circuit board can be reduced. In addition, since the exposed components 20 and the internal component 30 can be simultaneously attached to a single circuit board 40C, work related to the process of bonding them to the respective circuit boards in the above embodiments can be reduced.

In this embodiment, the sheet circuit board 50C only requires connection at two locations between the terminal parts 530B of the loop antenna 53B and the third front wiring pads 43pB of the IC chip 31 of the circuit board 40C. This reduces work related to the connection process of the connection parts and the risk of contact failure.

The sheet circuit board 50C includes only the loop antenna 53B on the back surface 51g of the sheet body 51, which allows the loop antenna 53B to be easily placed. Since the sheet circuit board 50C has no wiring to the front surface 51f of the sheet body 51, the manufacturing process and cost of the sheet circuit board 50C can be reduced.

Fourth Embodiment

Figure 12:
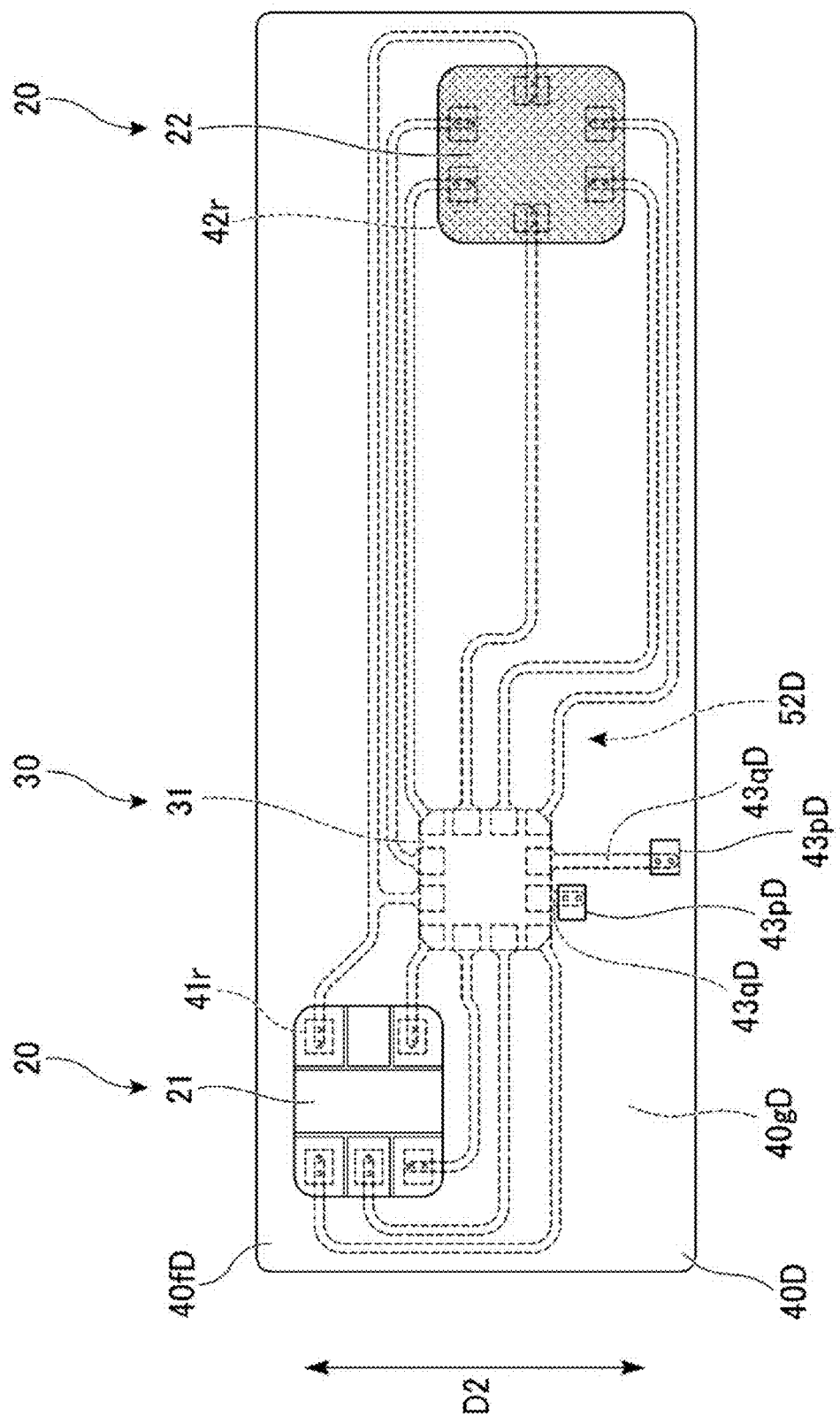
FIG. 12 is a diagram of a circuit board having various components of the IC card according to the fourth embodiment of the present invention as viewed from the front surface side.
Figure 13:
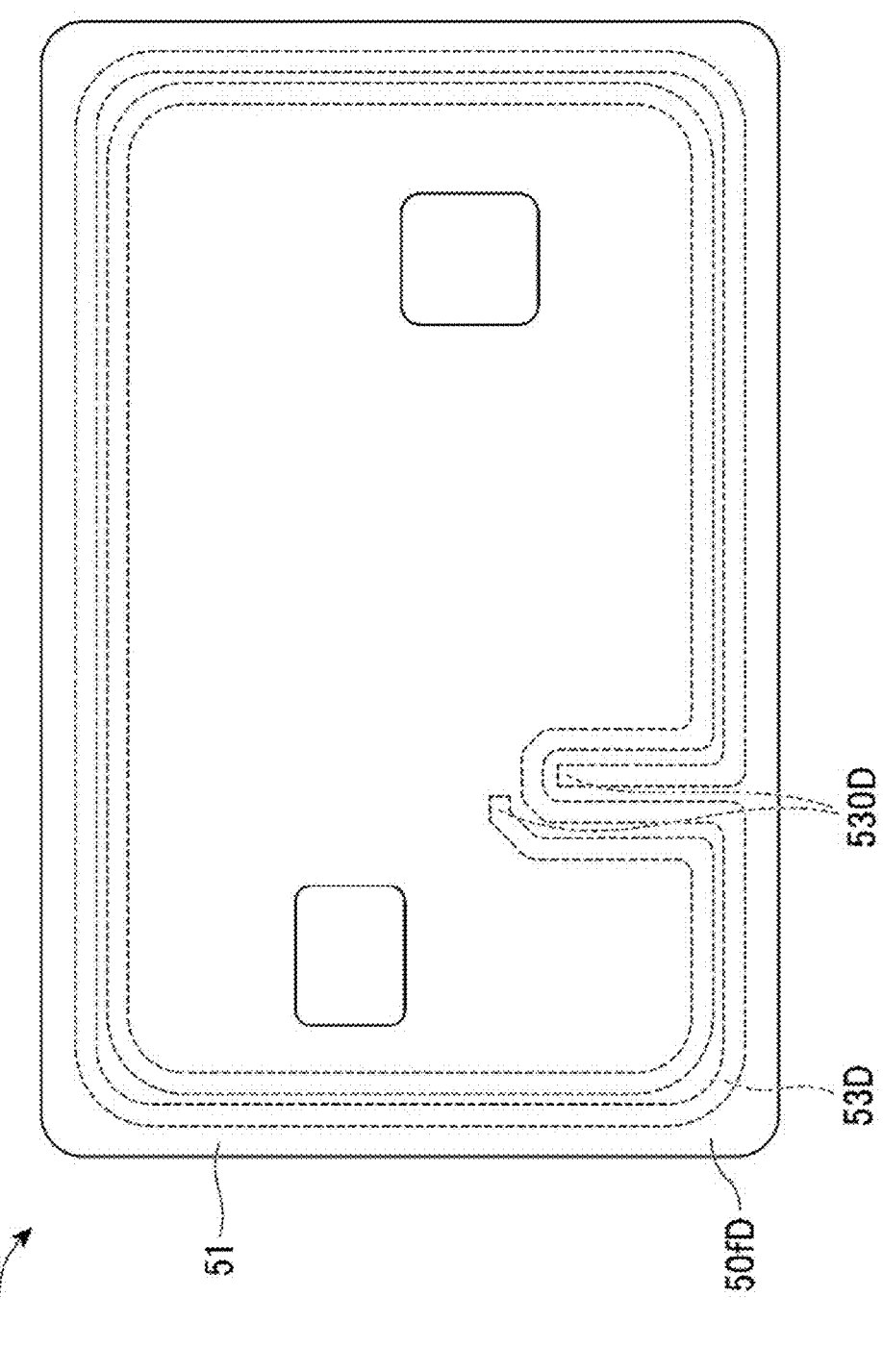
FIG. 13 is a diagram of a sheet circuit board of the IC card according to the fourth embodiment as viewed from the front surface side.
Figure 14:
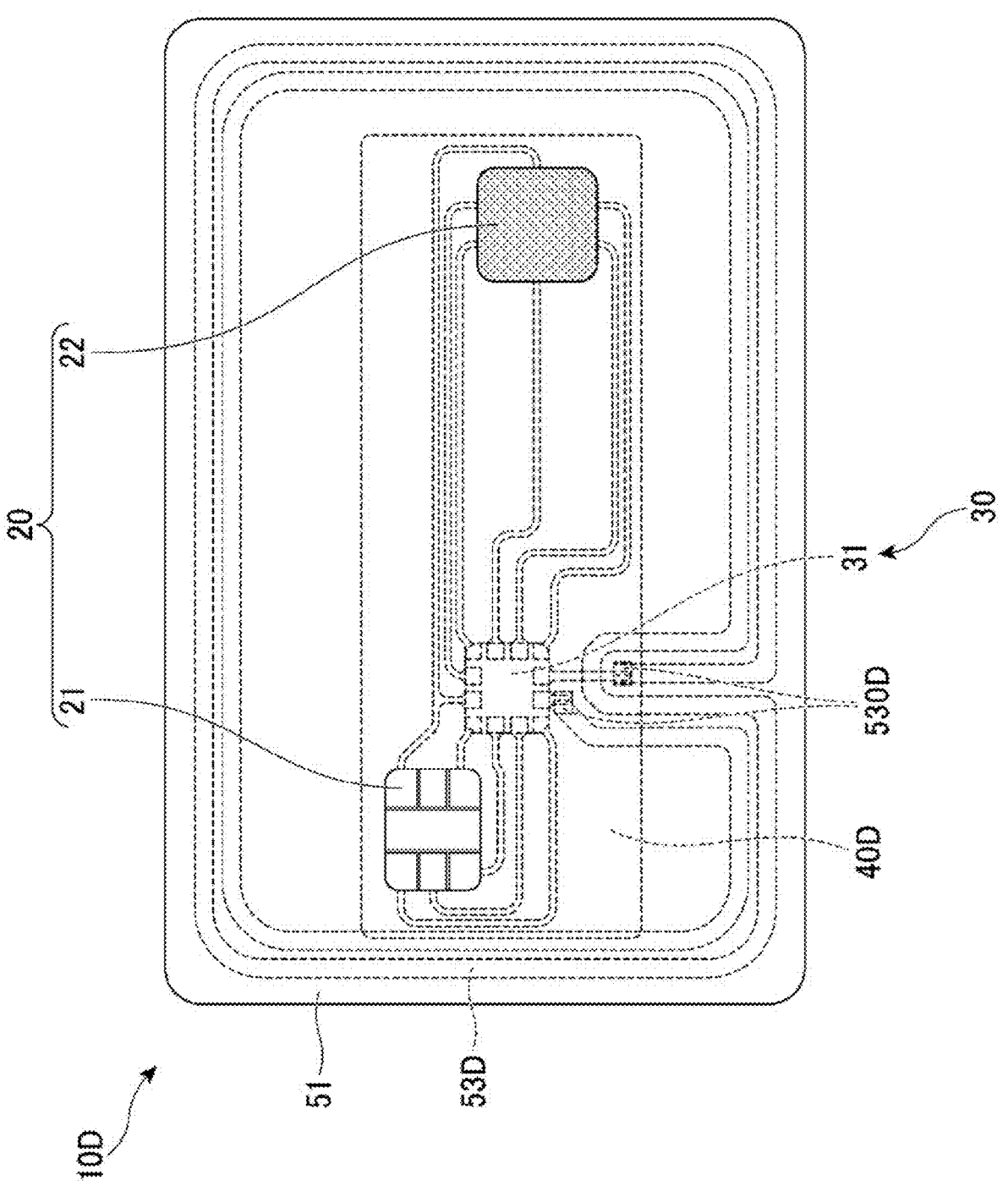
FIG. 14 is a diagram of an inlet of the IC card according to the fourth embodiment as viewed from the front surface.

Next, a fourth embodiment of the present invention will be described with reference to FIGS. 12 to 14. All the following embodiments particularly have circuit boards that are different from that of the third embodiment. As shown in FIGS. 12 to 14, an inlet 10D embedded in the IC card (not shown) according to the fourth embodiment of the present invention includes the exposed components 20, the internal component 30, a circuit board 40D, and a sheet circuit board 50D.

As in the third embodiment, the circuit board 40D is a single board combining all the functions of the first and second circuit boards 41 and 42 of the first embodiment, and the third circuit board 43B of the second embodiment. The circuit board 40D includes the exposed components 20 on a front surface 40fD, and the internal component 30 on a back surface 40gD. The circuit board 40D also includes a sheet wiring part 52D and third back wiring pads 43qD on the back surface 40gD. Further, compared to the third embodiment, the circuit board 40D includes two third front wiring pads 43pD on the front surface 40fD whose positions are changed from those of the third front wiring pads 43pB.

The internal component 30 included in the circuit board 40D is located closer to the center of the circuit board 40D than in the third embodiment. Specifically, the internal component 30 is located closer to the center in the short side direction D2 along the front surface 40fD of the circuit board 40D. The circuit board 40D includes two third front wiring pads 43pD on the front surface 40fD at positions different from those of the third front wiring pads 43pB in accordance with the change in the position of the internal component 30. The sheet wiring part 52D are electrically connected to the first front wiring inner pads 41r (board wiring part) and the second front wiring inner pads 42r (board wiring part) arranged on the front surface 40fD of the circuit board 40D via, for example, through holes penetrating the circuit board 40D. Further, the third back wiring pads 43qD provided on the back surface 40gD are formed as appropriate in accordance with the changes in the positions of the third front wiring pads 43pD. The third back wiring pads 43qD are electrically connected to the two third front wiring pads 43pD connected to the terminal parts 530D of the loop antenna 53D via, for example, through holes penetrating the circuit board 40D. The circuit board 40D is set to have a substantially rectangular shape on which the exposed components 20, the internal component 30, and the sheet wiring part 52D can be arranged. The circuit board 40D is designed to have a smaller size than the circuit board 40C.

The sheet circuit board 50D includes the sheet body 51 and the loop antenna 53D. In this embodiment, the position of the internal component 30 included in the circuit board 40D is changed as compared with the third embodiment. Therefore, the terminal parts 530D of the loop antenna 53D are repositioned so as to be connected to the third front wiring pads 43pD, which have been repositioned to follow the internal component 30. The terminal parts 530D of the loop antenna 53D is provided on the sheet body 51 so as to be closer to the center in the short side direction D2 along the front surface 50fD of the sheet circuit board 50D as compared with the third embodiment.

In this embodiment, since the above configuration allows the circuit board 40D to be even smaller than the circuit board 40C of the third embodiment described above, the manufacturing cost of the circuit board 40D can be reduced.
(Modifications)

Next, modifications according to the present invention will be described that share a similar basic configuration with the first embodiment. Therefore, similar components will be given the same reference numerals and will not be explained, and only the differences will be explained.

Figure 15:
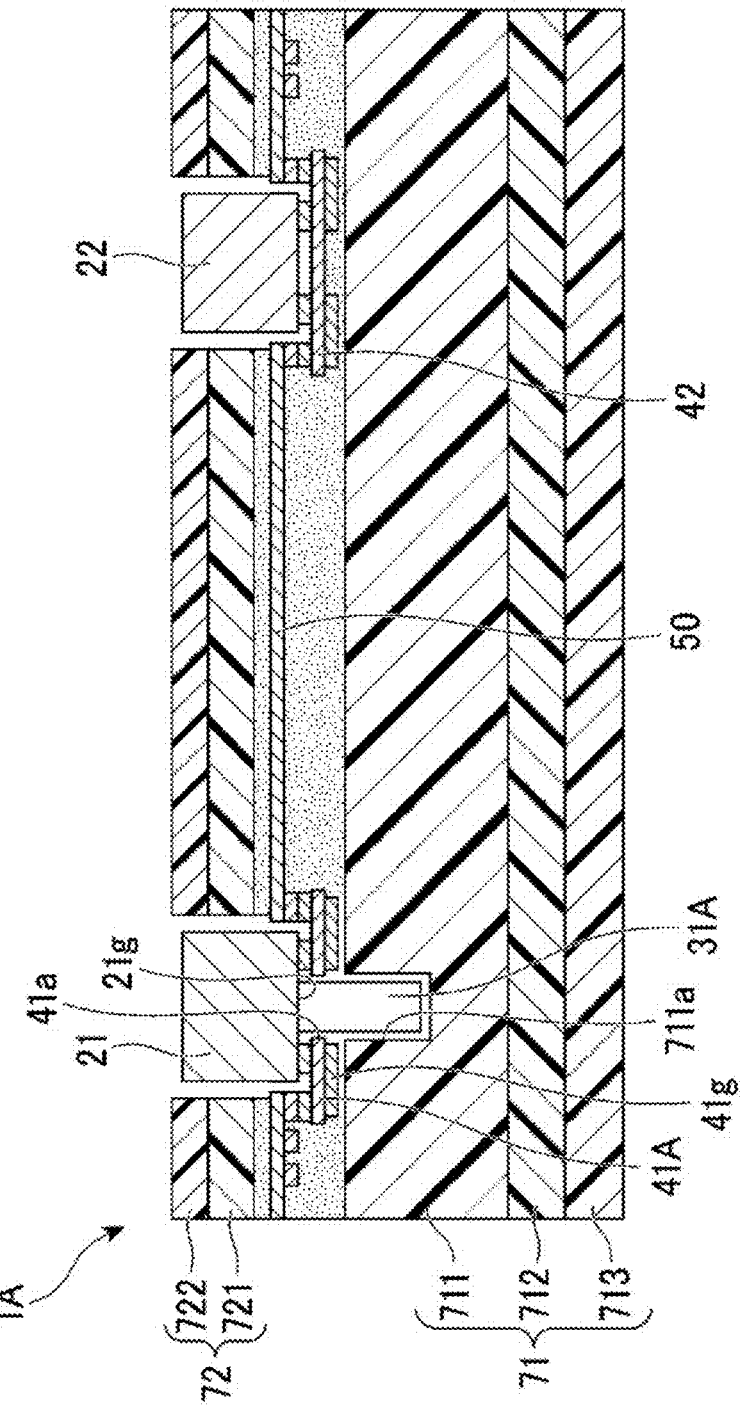
FIG. 15 is a cross-sectional view of the IC card according to a modification of the present invention.

As shown in FIG. 15, an IC card 1A of this modification differs from the configuration of the first embodiment in the positioning of the IC chip (internal component) 31A.

The IC chip 31A is provided on the back surface 21g of the contact terminal 21. The IC chip 31A is bonded to the contact terminal 21 using a bonding material (not shown). A through hole (internal component through hole) 41a having a size that allows the IC chip 31A to pass through is formed in the first circuit board (circuit board) 41A. A small gap is formed between the through hole 41a and the IC chip 31A.

Further, the first card base material 711 is formed with a recess 711a that can accommodate the IC chip 31A. A small gap is formed between the recess 711a and the IC chip 31A.

The IC chip 31A is bonded to the contact terminal 21 in a state where it penetrates the through hole 41a and is accommodated in the recess 711a.

This configuration allows the first card base material 711 to have a reduced thickness. Therefore, the thickness of the IC card 1A can be reduced.

Note that the IC chip 31A may be formed integrally with the contact terminal 21. The size of the IC chip 31A is not particularly limited. The IC chips in the second to fourth embodiments may be provided on the back surface 21g of the contact terminal 21.

In the embodiments described above, the IC card 1 includes three circuit boards 40 or 40B, but the number of circuit boards is not particularly limited. The number of exposed components and internal components the one or more circuit boards have in the IC card 1 is also not particularly limited.

In the above embodiment, the inlets 10, 10B, 10C, and 10D include the contact terminal 21 and the fingerprint sensor 22 as the exposed components 20, but this configuration is not an essential configuration. For example, the inlet of the present invention may include both the contact terminal 21 and the fingerprint sensor 22 or may include either one of them.

In the above embodiments, the IC card 1 includes the fingerprint sensor 22 as a biometric authentication sensor, but the IC card of the present invention is not particularly limited to a fingerprint sensor as long as it has a biometric authentication function. For example, the IC card may be a biometric authentication sensor that performs biometric authentication using an eyeball, veins, or the like.

In the above embodiments, the inlets 10, 10B, 10C, and 10D have the IC chip 31 having a contact-type communication function and a non-contact-type communication function as the internal component 30. However, the internal component of the present invention suffices if it has one of a contact-type communication function or a non-contacttype communication function. The internal component of the present invention is not limited to an IC chip and suffices if it has one of a contact-type communication function or a contactless-type communication function. The number of internal components is also not limited.

In this embodiment, the IC card 1 includes the IC chip 31 as the internal component 30 on the back surface 40g of the circuit board 40. However, the internal component 30 is not limited to this embodiment, and it is also possible that the internal component 30 is not included. For example, the IC card 1 may be configured such that the internal component 30 (IC chip 31) is integrated with the exposed component 20 (contact terminal 21).

In the above embodiments, the circuit board and the sheet circuit board in the inlet 10, 10B, 10C, or 10D are formed individually. Therefore, a plurality of IC cards 1 can be formed simultaneously by, for example, providing a plurality of sheet wiring parts and loop antennas on a sheet body that is larger than the sheet bodies of the sheet circuit boards of the above embodiments, and bonding the circuit board thereto and performing a lamination process. This makes it possible to reduce the manufacturing process and cost of the IC card 1. In the case a plurality of IC cards 1 are laminated with the same exterior base material 70, it is necessary to accurately arrange a certain number of exposed components 20 corresponding to the number of IC cards 1 with respect to the openings 720 in the front exterior base material 72. According to the IC cards of the present invention, the certain number of exposed components corresponding to the number of IC cards can be accurately arranged with respect to the openings in the exterior base material.

In the present invention, the sheet circuit board of the IC card 1 does not need to include a loop antenna.

In the present invention, the IC card 1 may further include a spacer or the like for adjusting the height of an exposed component 20 and an internal component 30.

In any of the above embodiments, according to the inlet and card medium of the present invention, the exposed components mounted on the circuit board and having different thicknesses can be accurately arranged with respect to the openings in the exterior base material that covers the circuit board.

INDUSTRIAL APPLICABILITY

According to the inlet of the present invention, an exposed component bonded to a circuit board can be accurately placed with respect to the sheet circuit board. According to the card medium of the present invention, an exposed component bonded to a circuit board can be accurately placed with respect to an opening in an external base material covering the circuit board.

[Reference Signs List] 1 . . . IC card (card medium); 1f . . . Front surface of IC card (front surface); 1g . . . Back surface of IC card (back surface); 10, 10B, 10C, 10D . . . Inlet; 10f . . . Front surface of inlet; 10g . . . Back surface of Inlet; 20 . . . Exposed component; 21 . . . Contact terminal (exposed component); 22 . . . Fingerprint sensor (exposed component, biometric authentication sensor); 30 . . . Internal component; 31 . . . IC chip; 40, 40B, 40C, 40D . . . Circuit board; 41 . . . First circuit board; 41p . . . First front wiring outer pad; 41r . . . First front wiring inner pad (board wiring part); 42 . . . Second circuit board; 42p . . . Second front wiring outer pad; 42r . . . Second front wiring inner pad (board wiring part); 43, 43B . . . Third circuit board; 43p, 43pB, 43pD . . . Third front wiring pad (connection part of loop antenna); 50, 50B, 50C, 50D . . . Sheet circuit board;

51 . . . Sheet body (sheet); 520 . . . Through hole (sheet through hole); 51*f* . . . Front surface of sheet body; 51*g* . . . Back surface of sheet body (back surface of sheet); 52, 52B, 52C, 52D . . . Sheet wiring part; 523 . . . Antenna wiring part; 53 . . . Loop antenna; 60 . . . Adhesive layer; 70 . . . External base material.

What is claimed is:

1. An inlet embedded in a card medium, comprising:

an exposed component at least partially exposed on a front surface of the card medium;

a circuit board including a board wiring part to which the exposed component is bonded on a front surface side, the circuit board being provided closer to a back surface of the card medium than the exposed component is; and a sheet circuit board provided closer to the front surface than the circuit board is, the sheet circuit board comprising a sheet body;

a sheet wiring part electrically connected to the board wiring part on a back surface side, and a sheet including at least one sheet through hole through which the exposed component can pass, wherein the exposed component comprises a biometric sensor that detects biometric information of a user, the biometric sensor is a semiconductor device electrically connected to the board wiring part; and the biometric sensor is at least partially exposed on the front surface of the card medium.

2. The inlet of claim 1, wherein the exposed component comprises a contact terminal that makes contact with a contact-type external device, and the circuit board further comprises an internal component having a contact-type communication function on the back surface side.

3. The inlet of claim 2, wherein the exposed component, the board wiring part, and the internal component are all included in the same circuit board.

4. The inlet of claim 2, wherein the internal component is provided on a back surface side of the exposed component, and an internal component through hole through which the internal component can pass is formed in the circuit board.

5. The inlet of claim 1, wherein the circuit board includes an internal component having a contactless-type communication function on the back surface side, and the sheet circuit board further includes a loop antenna on the back surface side.

6. The inlet of claim 5, wherein the circuit board has a connection part of the loop antenna having a jumper wiring function, and the sheet wiring part is entirely placed on the back surface side of the sheet.

7. A card medium, comprising:

an inlet;

an upper external base material; and a lower external base material, wherein the inlet includes an exposed component at least partially exposed on a front surface of the card medium, a circuit board including a board wiring part to which the exposed component is bonded on a front surface side, the circuit board being provided closer to a back surface of the card medium than the exposed component is, and a sheet circuit board provided closer to the front surface than the circuit board is, the sheet circuit board comprising a sheet body;

a sheet wiring part electrically connected to the board wiring part, and a sheet including at least one sheet through hole through which the exposed component can pass, the upper exterior base material is provided closer to the front surface than the inlet is, and includes at least one penetrable external through hole at substantially the same position as the sheet through hole, and the lower exterior base material is provided closer to the back surface than the inlet is, wherein the exposed component comprises a biometric sensor that detects biometric information of a user, the biometric sensor is a semiconductor device electrically connected to the board wiring part; and the biometric sensor is at least partially exposed on the front surface of the card medium.

8. The card medium of claim 7, wherein a size of the exterior through hole is larger than a size of the sheet through hole.

* * * * *